United States Patent
Jain et al.

(10) Patent No.: US 9,930,175 B2
(45) Date of Patent: *Mar. 27, 2018

(54) SYSTEMS AND METHODS FOR LEAD ROUTING

(71) Applicant: YP LLC, Tucker, GA (US)

(72) Inventors: Mehul Jain, Foster City, CA (US); Karthik Raman, Dublin, CA (US); Chitiksha Shah, Playa Del Rey, CA (US); Kent William Laux, Fremont, CA (US); Deepak Kumar Thakral, Burbank, CA (US)

(73) Assignee: YP LLC, Tucker, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,043

(22) Filed: Aug. 1, 2017

(65) Prior Publication Data
US 2017/0331953 A1 Nov. 16, 2017

Related U.S. Application Data

(63) Continuation of application No. 14/458,080, filed on Aug. 12, 2014.

(51) Int. Cl.
*H04M 3/00* (2006.01)
*H04M 3/436* (2006.01)
(Continued)

(52) U.S. Cl.
CPC .......... *H04M 3/4365* (2013.01); *G06Q 10/10* (2013.01); *G06Q 30/01* (2013.01);
(Continued)

(58) Field of Classification Search
CPC .......... H04Q 2213/13097; H04Q 2213/13141; H04Q 3/66; H04M 3/5175; H04M 3/523;
(Continued)

(56) References Cited

U.S. PATENT DOCUMENTS

| 5,390,474 A | 2/1995 | Goggins |
|---|---|---|
| 7,689,466 B1 | 3/2010 | Benbrahim et al. |

(Continued)

OTHER PUBLICATIONS

Berry, Data Mining Techniques: for Marketing, Sales and Customer Relationships, 2004.
(Continued)

*Primary Examiner* — Rasha Al Aubaidi
(74) *Attorney, Agent, or Firm* — Alston & Bird LLP

(57) ABSTRACT

Systems, methods, apparatuses, and computer-readable media for managing and evaluating leads from incoming calls are provided. A first inbound call from a first caller may be received. A first set of information identifying characteristics of the first inbound call may be processed. A second set of information identifying characteristics of the first inbound call may be determined based on the first set of information. A first category may be matched to the first inbound call. A first receiver may be determined. A second inbound call from a second caller may be received. A third set of information identifying characteristics of the second inbound call may be processed. A fourth set of information identifying characteristics of the second inbound call may be determined based on the third set of information. A second category may be matched to the second inbound call. A second receiver may be determined.

27 Claims, 21 Drawing Sheets

(51) Int. Cl.
*H04M 3/51* (2006.01)
*H04M 3/487* (2006.01)
*G06Q 10/10* (2012.01)
*G06Q 30/00* (2012.01)
*G06Q 30/02* (2012.01)

(52) U.S. Cl.
CPC .......... *G06Q 30/02* (2013.01); *H04M 3/4878* (2013.01); *H04M 3/51* (2013.01); *H04M 2203/1058* (2013.01)

(58) Field of Classification Search
CPC .... H04M 3/51; H04M 3/5191; H04M 3/5233; H04M 3/5232; H04M 3/5235; H04M 3/5183; G06Q 10/06313; G06Q 30/0244
USPC .......................... 379/221.14, 265.01–265.02, 379/265.11–265.13, 266.02; 705/14.43, 705/7.23
See application file for complete search history.

(56) References Cited

U.S. PATENT DOCUMENTS

| | | | |
|---|---|---|---|
| 8,239,273 | B1 | 8/2012 | Marshall et al. |
| 8,577,016 | B1 | 11/2013 | Duva et al. |
| 8,781,105 | B1 | 7/2014 | Duva et al. |
| 2002/0049635 | A1 | 4/2002 | Mai et al. |
| 2002/0123984 | A1 | 9/2002 | Prakash |
| 2005/0055337 | A1 | 3/2005 | Bebo et al. |
| 2006/0242017 | A1 | 10/2006 | Libes et al. |
| 2006/0277108 | A1 | 12/2006 | Altberg et al. |
| 2007/0100834 | A1 | 5/2007 | Landry et al. |
| 2007/0162334 | A1 | 7/2007 | Altberg et al. |
| 2007/0233577 | A1 | 10/2007 | Glass |
| 2007/0255611 | A1 | 11/2007 | Mezo et al. |
| 2008/0059298 | A1 | 3/2008 | Waag et al. |
| 2009/0144068 | A1 | 6/2009 | Altberg et al. |
| 2009/0187459 | A1 | 7/2009 | Hayes et al. |
| 2009/0247193 | A1 | 10/2009 | Kalavade |
| 2009/0299831 | A1 | 12/2009 | Li et al. |
| 2010/0093441 | A1 | 4/2010 | Rajaraman et al. |
| 2011/0196733 | A1 | 8/2011 | Li et al. |
| 2011/0213741 | A1 | 9/2011 | Shama et al. |
| 2011/0246260 | A1 | 10/2011 | Gilbert |
| 2011/0275047 | A1 | 11/2011 | Gomes et al. |
| 2011/0295628 | A1 | 12/2011 | Priyadarshan et al. |
| 2012/0078742 | A1 | 3/2012 | Oleen |
| 2012/0078938 | A1 | 3/2012 | Davis et al. |
| 2012/0116872 | A1 | 5/2012 | Hicken et al. |
| 2012/0179568 | A1 | 7/2012 | Soroca et al. |
| 2013/0124259 | A1 | 5/2013 | Chourey et al. |
| 2013/0129060 | A1 | 5/2013 | Gopalakrishnan et al. |
| 2013/0254035 | A1 | 9/2013 | Ramer et al. |
| 2013/0297442 | A1 | 11/2013 | Simons et al. |
| 2014/0012678 | A1 | 1/2014 | Hayes, Jr. |
| 2014/0222551 | A1 | 8/2014 | Jain et al. |
| 2015/0046214 | A1 | 2/2015 | Jain et al. |
| 2016/0050316 | A1 | 2/2016 | Jain et al. |

OTHER PUBLICATIONS

United States Patent and Trademark Office, Office Action for U.S. Appl. No. 14/458,080, dated Sep. 10, 2015, 5 pages, U.S.A.
United States Patent and Trademark Office, Office Action for U.S. Appl. No. 14/458,080, dated Apr. 21, 2016, 13 pages, U.S.A.
United States Patent and Trademark Office, Office Action for U.S. Appl. No. 14/458,080, dated Aug. 5, 2016, 13 pages, U.S.A.
United States Patent and Trademark Office, Office Action for U.S. Appl. No. 14/458,080, dated Jan. 10, 2017, 15 pages, U.S.A.
United States Patent and Trademark Office, Office Action for U.S. Appl. No. 14/458,080, dated Nov. 25, 2015, 7 pages, U.S.A.
United States Patent and Trademark Office, Notice of Allowance for U.S. Appl. No. 14/458,080, May 3, 2017, 6 pages, U.S.A.

SYSTEMS AND METHODS FOR LEAD ROUTING

CROSS-REFERENCES TO RELATED APPLICATIONS

This patent application is a continuation of U.S. patent application Ser. No. 14/458,080, filed Aug. 12, 2014, the contents of which are hereby incorporated in its entirety by reference.

BACKGROUND

Aspects of the disclosure relate to call management. In particular, aspects of the disclosure relate to systems, methods, apparatuses, and computer-readable media for managing and evaluating leads from incoming calls.

Businesses depend on generating revenue from customers. Potential customers can be repeat customers or new customers. When a potential customer is considering a purchase, they can be called a lead. While not all leads may lead to a purchase, with enough leads a business becomes more likely to make a sale. Management of these leads can be important to ensure the generation of revenue for the business.

Leads can be at different stages of a purchasing process. A purchasing process can start at investigation, move to feature comparison, move to price comparison, and then to purchasing decision. Often, leads in a purchasing decision part of the process are viewed as valuable because the leads are likely to make a near future purchase. However, this evaluation can change depending on the industry, company, and/or lead itself.

BRIEF SUMMARY

Certain embodiments of the present disclosure relates in general to call management. In particular, aspects of the disclosure relate to systems, methods, apparatuses, and computer-readable media for managing and evaluating leads from incoming calls.

In one aspect, a system for centrally managing a plurality of inbound calls is provided. The system may include any one or combination of the following. A network interface may facilitate communication with a set of callers and a set of receivers. A datastore may store information relating to a set of categories, the set of receivers, and a set of associations between at least one receiver of the set of receivers and at least one category of the set of categories. A telephony switch may be in communication with the datastore and the network interface. The telephony switch may facilitate any one or combination of the following. A first inbound call from a first caller may be received. A first set of information about the first inbound call may be processed. The first set of information may identify characteristics corresponding to the first inbound call. A second set of information about the first inbound call may be determined based at least in part on the first set of information. The second set of information may identify characteristics corresponding to the first caller. A first category of the set of categories may be matched to the first inbound call based at least in part on the first set of information and the second set of information. A first receiver of the first inbound call may be determined based at least in part on the first category. The first receiver may be selected from a first set of receivers associated with the first category. First association information may be retained in the datastore relating to the matching of the first category and the first inbound call. A second inbound call may be received from a second caller. A third set of information about the second inbound call may be processed. The third set of information may identify characteristics corresponding to the second inbound call. A fourth set of information about the second inbound call may be determined based at least in part on the third set of information. The fourth set of information may identify characteristics corresponding to the second caller. A second category of the set of categories may be matched to the second inbound call based at least in part on the third set of information and the fourth set of information. A second receiver of the second inbound call may be determined based at least in part on the second category. The second receiver may be selected from a second set of receivers associated with the second category. Second association information may be retained in the datastore relating to the matching of the second category and the second inbound call. The first category and the second category may be different. The first caller and the second caller may be different.

In some embodiments, the categories may be categories from a telephone directory. In some embodiments, the characteristics of the first inbound call may further include an incoming telephone number and a telephone number called. In some embodiments, the characteristics of the first caller may further include demographic information. In some embodiments, the demographic information may indicate one or more of a language spoken, an estimated income, an estimated age group and/or an estimated family size.

In some embodiments, a quality management system may be configured to measure success of a set of receivers. In some embodiments, the quality management system may include a call timer configured to measure call duration.

In another aspect, a method for managing a plurality of inbound calls is provided. The method may include any one or combination of the following. A first inbound call from a first caller may be received. A first set of information about the first inbound call may be processed. The first set of information may identify one or more characteristics of the first inbound call. A second set of information about the first inbound call may be determined based at least in part on the first set of information. The second set of information may identify one or more characteristics of the first caller. A first category may be matched to the first inbound call based at least in part on the first set of information and the second set of information. A first receiver of the first call may be determined based at least in part on the determined first category. The first receiver may be selected from a first set of receivers associated with the first category. A second inbound call from a second caller may be received. A third set of information about the second inbound call processed. The third set of information may identify one or more characteristics of the first inbound call. A fourth set of information about the second inbound call may be determined based at least in part on the third set of information. The fourth set of information may identify one or more characteristics of the second caller. A second category may be matched to the second inbound call based at least in part on the third set of information and the fourth set of information. A second receiver of the second call may be determined based at least in part on the determined second category. The second receiver may be selected from a second set of receivers associated with the second category. The first category and the second category may be different. The first caller and the second caller may be different.

In some embodiments, a lead quality score of the first call may be determined based at least in part on call characteristics. In some embodiments, a pricing of the first call lead may be determined based at least in part on the lead quality score. In some embodiments, the determining the lead quality score may include analyzing spoken words of the call conversation.

In some embodiments, a pricing of a lead generated by the first call may be determined based at least in part on determined lead needs from the spoken words. In some embodiments, the one or more characteristics of the first inbound call may include an incoming telephone number and a telephone number called. In some embodiments, the determining the first receiver of the first call may include weighting the characteristics of the first call and the characteristics of the first caller differently based at least in part on the determined category, and matching characteristics of the first receiver to the weighted characteristics.

In some embodiments, a receiver quality score of the first receiver may be determined based at least in part on an outcome of the first inbound call. In some embodiments, the determining the first receiver of the first call may include using the receiver quality score in determining which receiver receives the first call.

In yet another aspect, a non-transitory, machine-readable medium having machine-readable instructions thereon for managing an online presence is provided. The instructions, when executed by one or more computers or other processing devices, may cause the one or more computers or other processing devices to perform any one or combination of the following. A first inbound call from a first caller may be received. A first set of information about the first inbound call may be processed. The first set of information may identify one or more characteristics of the first inbound call. A second set of information about the first inbound call may be determined based at least in part on the first set of information. The second set of information may identify one or more characteristics of the first caller. A first category may be matched to the first inbound call based at least in part on the first set of information and the second set of information. A first receiver of the first call may be determined based at least in part on the determined first category. The first receiver may be selected from a first set of receivers associated with the first category. A second inbound call from a second caller may be received. A third set of information about the second inbound call may be processed. The third set of information may identify characteristics of the first inbound call. A fourth set of information about the second inbound call may be determined based at least in part on the third set of information. The fourth set of information may identify one or more characteristics of the second caller. A second category may be matched to the second inbound call based at least in part on the third set of information and the fourth set of information. A second receiver of the second call may be determined based at least on the determined second category. The second receiver may be selected from a second set of receivers associated with the second category. The first category and the second category may be different. The first caller and the second caller may be different.

In some embodiments, the determining the first receiver of the first call may include weighting the one or more characteristics of the first caller based at least in part on the first category to generate one or more weighted characteristics, matching the one or more weighted characteristics of the first caller of the first call to characteristics of the first set of receivers associated with the first category, and determining the first receiver based at least in part on the one or more weighted matched characteristics.

In some embodiments, a lead quality score of the first call may be determined based at least in part on an outcome of the first call. In some embodiments, a lead generated from the first call may be dynamically priced based at least in part on an outcome of the first call.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
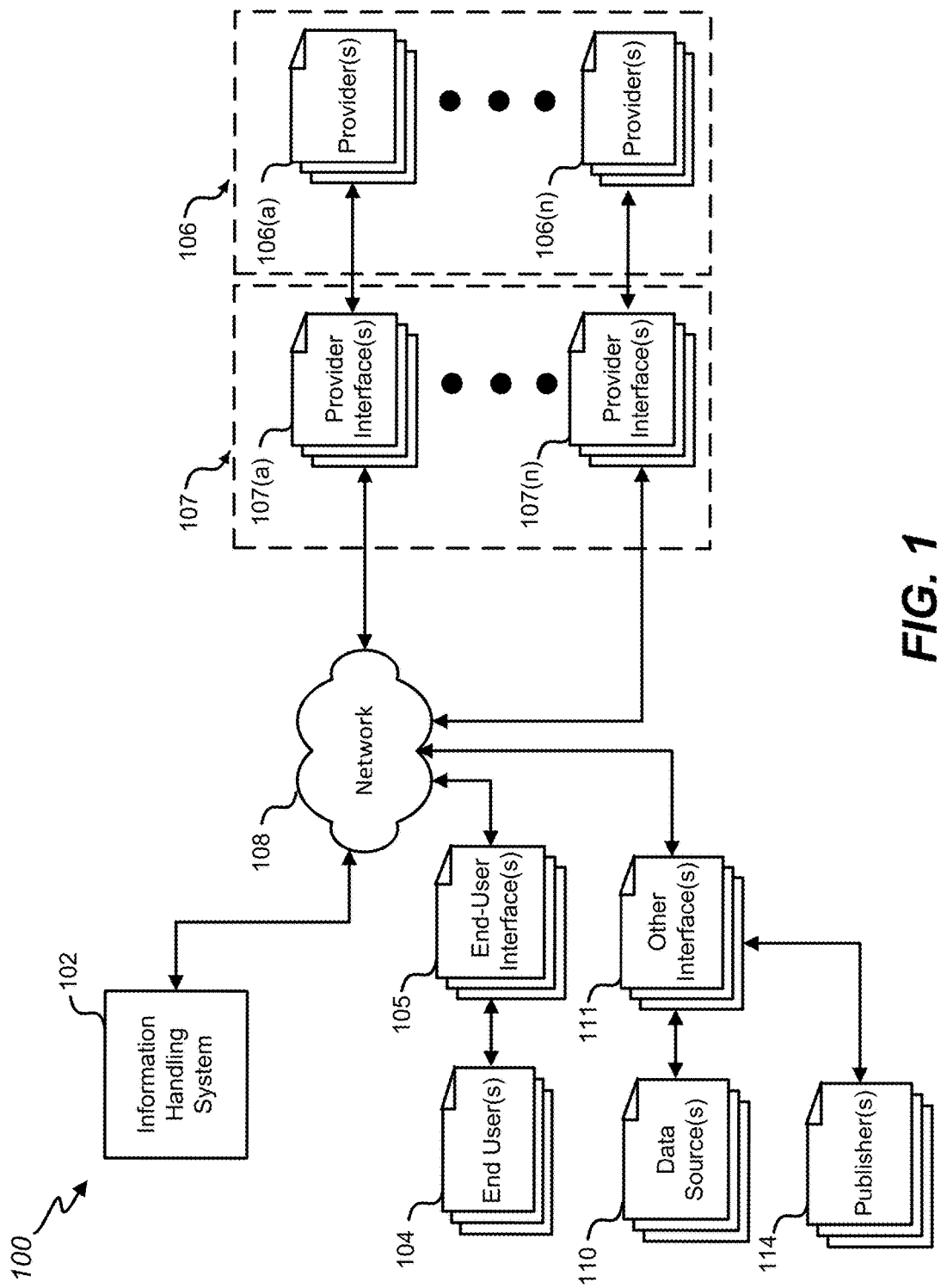
FIG. 1 depicts a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 may allow interaction between two or more of an information handling system 102, end-user interface(s) 105, end user(s) 104, provider interface(s) 107, provider(s) 102, other interface(s) 111, data source(s) 110, and/or publisher(s) 114. An end-user 104, in some embodiments, may correspond to a consumer of products, services, and/or information. In some embodiments, an end-user 104 may correspond to a caller. In some embodiments, system 100 may also allow for transfer of information from and/or to one or more providers 102 and/or one or more data sources 110. A provider 102, in various embodiments, may correspond to (and may be variously referenced herein by) any one or combination of a service provider, a product provider, a merchant, a business, an advisor, a representative, an advertiser, and/or the like. In some embodiments, a provider 102 may correspond to a receiver of communications (e.g., calls) from end-users 104. As depicted, various elements of the system 100 may be communicatively coupled or couplable to a network 108.

The network 108 may be any suitable means to facilitate data transfer in the system 100 and could include multiple networks and/or network components. In various embodiments, the network 108 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, a conventional telephone network, and/or any other appropriate architecture or system that facilitates the communication of signals, data, and/or message. The network 108 may transmit data using any suitable communication protocol. The network 108 and its various components may be implemented using hardware, software, and communications media such wires, optical fibers, microwaves, radio waves, and other electromagnetic and/or optical carriers, and/or any combination of the foregoing. In some embodiments, the network 108 may include a telephone network that may be circuit switched, package switched, or partially circuit switched and partially package switched. For example, the telephone network may partially use the Internet to carry phone calls (e.g., through VoIP).

The information handling system 102 may be communicatively coupled or couplable to the network 108 (which may also be referenced herein as an advertising information handling system) may facilitate searching of one or more information repositories in response to information received over the network 108 from any one or combination of the interfaces. In various embodiments, the information handling system 102 may include any device or set of devices configured to process, send, receive, retrieve, detect, generate, compute, organize, categorize, qualify, store, display, present, handle, or use any form of information and/or data suitable for the embodiments described herein. The information handling system 102 could include a single computing device, a server, for example, or multiple computing devices, which may be implemented in or with a distributed computing and/or cloud computing environment with a plurality of servers and cloud-implemented resources. Thus, the information handling system 102 may include one or more servers. The information handling system 102 may include one or more processing resources communicatively coupled to one or more storage media, random access memory (RAM), read-only memory (ROM), and/or other types of memory. The information handling system 102 may include any one or combination of various input and output (I/O) devices, network ports, and display devices.

According to certain embodiments, the information handling system 102 may be or include a provider management platform. A provider 102 may access the information handling system 102 via a provider interface 107. An end user 104 may access the information handling system 102 via an end-user interface 105. The information handling system 102 may facilitate searching of one or more information repositories in response to information received over the network 108 from the end-user interfaces 105 and/or provider interfaces 107.

The end-user interfaces 105 and/or provider interfaces 107 may allow for transfer of and access to information in accordance with certain embodiments disclosed herein. In various embodiments, the end-user interface(s) 105 and/or service provider interface(s) 107 may include any suitable input/output module or other system/device operable to serve as an interface between a service provider(s) 102 and the provider management platform. The end-user interfaces 105 and/or provider interfaces 107 may facilitate communication over the network 108 using any suitable transmission protocol and/or standard. In various embodiments, the information handling system 102 may include, provide, and/or be configured for operation with the end-user interfaces 105 and/or provider interfaces 107, for example, by making available and/or communicating with one or more of a website, a web page, a web portal, a web application, a mobile application, enterprise software, and/or any suitable application software. In some embodiments, an end-user interface 105 and/or provider interface 107 may include an application programming interface (API).

In some embodiments, an end-user interface 105 and/or a provider interface 107 may include a web interface. In some embodiments, the end-user interface 105 and/or provider interface 107 may include or work with an application made available to one or more interfaces, such as a mobile application as discussed herein. In some embodiments, the end-user interface 105 and/or provider interface 107 may cause a web page to be displayed on a browser of a service provider 105. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the information handling system 102 may have web site(s)/portal(s) giving access to such information, such as a provider portal.

In various embodiments, an end-user interface 105 and/or a provider interface 107 may include providing one or more display screen images that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like.

In certain embodiments, an end-user interface 105 and/or a provider interface 107 may include a computing device of an end user 104 and/or a service provider 105. In certain embodiments, a provider interface 107 may include a mobile computing device that may be any portable device suitable for sending and receiving information over a network in accordance with embodiments described herein. For example without limitation, in various embodiments, the computing device may include one or more devices variously referenced as a desktop computer, mobile phone, a cellular telephone, a smartphone, a handheld mobile device, a tablet computer, a web pad, a personal digital assistant (PDA), a notebook computer, a handheld computer, a laptop computer, and/or the like. Some embodiments include a landline phone that may not be a computing device.

According to certain embodiments, the information handling system 102 may be or include an advertising platform. As previously noted, one or more providers 102 may correspond to one or more advertisers. In some embodiments, the information handling system 102 may provide for the selection and provision of advertisements to one or more end-user interfaces 105, end users 103, and/or publishers 114. In certain embodiments, providers 102 may have advertisements that may be placed in a web page made available to one or more end-user interfaces 105. In certain embodiments, providers 102 may have advertisements that may be displayed with an application made available to one or more end-user interfaces 105, such as a mobile application according to various embodiments. In some embodiments, placement of the advertisements could be in accordance with one or more paid placement arrangements and one or more advertising models.

Advertisements may be included in a results page responsive to a keyword search initiated by an end user 104 via, for example, a webpage and/or a mobile application. The search may be performed by an online search engine facilitated by the information handling system 102. An advertisement of provider 102 may be included within a results page with results identified and/or compiled by the search engine and sent via the network 108 to the end-user interface 105 of the end user 104 that initiated the search.

Advertisements may be provided for a publisher's website or other media channel. The publishers 114 may use, facilitate, and/or provide any of various types of media channels. For example, the media channels may correspond to one or more of web, mobile, social, video, television, and/or the like. In some embodiments, the publishers 114 may access the information handling system 102 via an application programming interface (API). In some embodiments, the publishers 114 may request one or more advertisements from the information handling system 102. In some embodiments, the requests may correspond to a search query from an end user 103.

In certain embodiments, the information handling system 102 may be communicatively coupled or couplable to one or more data sources 110. The one or more data sources 110 may include any suitable source of data. In various embodiments, a data source 110 may include any one or more or combination of a database, a website, any repository of data in any suitable form, and/or a third party. In various embodiments, the one or more data sources 110 may correspond to one or more social media websites and/or photo-sharing websites.

In various embodiments, the data from one or more of the data sources 110 may be retrieved and/or received by the information handling system 108 via the network 108, API calls, and/or through any other suitable means of transferring data. For example, in some embodiments, the information handling system 102 and the data sources 108, 110 could use any suitable means for direct communication. According to certain embodiments, data may be actively gathered and/or pulled from data sources 110, for example, by accessing a third party repository and/or by "crawling" various repositories. Other interface(s) 111 may facilitate communication with data source(s) 110, and, in various embodiments, may be implemented in similar manner to interfaces 105 and/or 107 or any other suitable interface.

In certain embodiments, the one or more data sources 110 may include one or more location data sources 110. With some embodiments, the one or more location data sources 110 may include one or more mobile computing device locator services that provide information regarding the location of one or more end-user interfaces 105. With some embodiments, the location data sources 110 may provide various details relating to call data. With some embodiments, the location data sources 110 may provide caller name information from calling name delivery (CNAM), also known as caller identification or caller ID, which information may be used to determine particular details about the caller. With some embodiments, the location data sources 110 may provide information about the area from which a caller is located. With some embodiments, the data sources 110 may provide demographic data about an area, information particular to a call/caller, and/or the like.

In some embodiments, providers 102 and end users 104 may communicate via Voice Over Internet Protocol (VoIP) technology with their respective interfaces. An end user 104 and an provider 102 may, in some embodiments, be communicatively coupled through switches of the network 108, which may include switches of a public telephone network, switches of the information handling system 102, and/or the like. In some embodiments, one or more providers 102 could be contacted by an end user 104 and/or the information handling system 102 via various media channels, such as email, chat, instant message, etc., and a provider 102 could respond via various media channels including, for example, the above listed various media channels. Communication between providers 102 and end users 104 may be established via telephonic connection, chat connection, game voice chat, private chat, video chat, videoconferencing, videophone calls, web conferencing, and/or the like.

Figure 2:
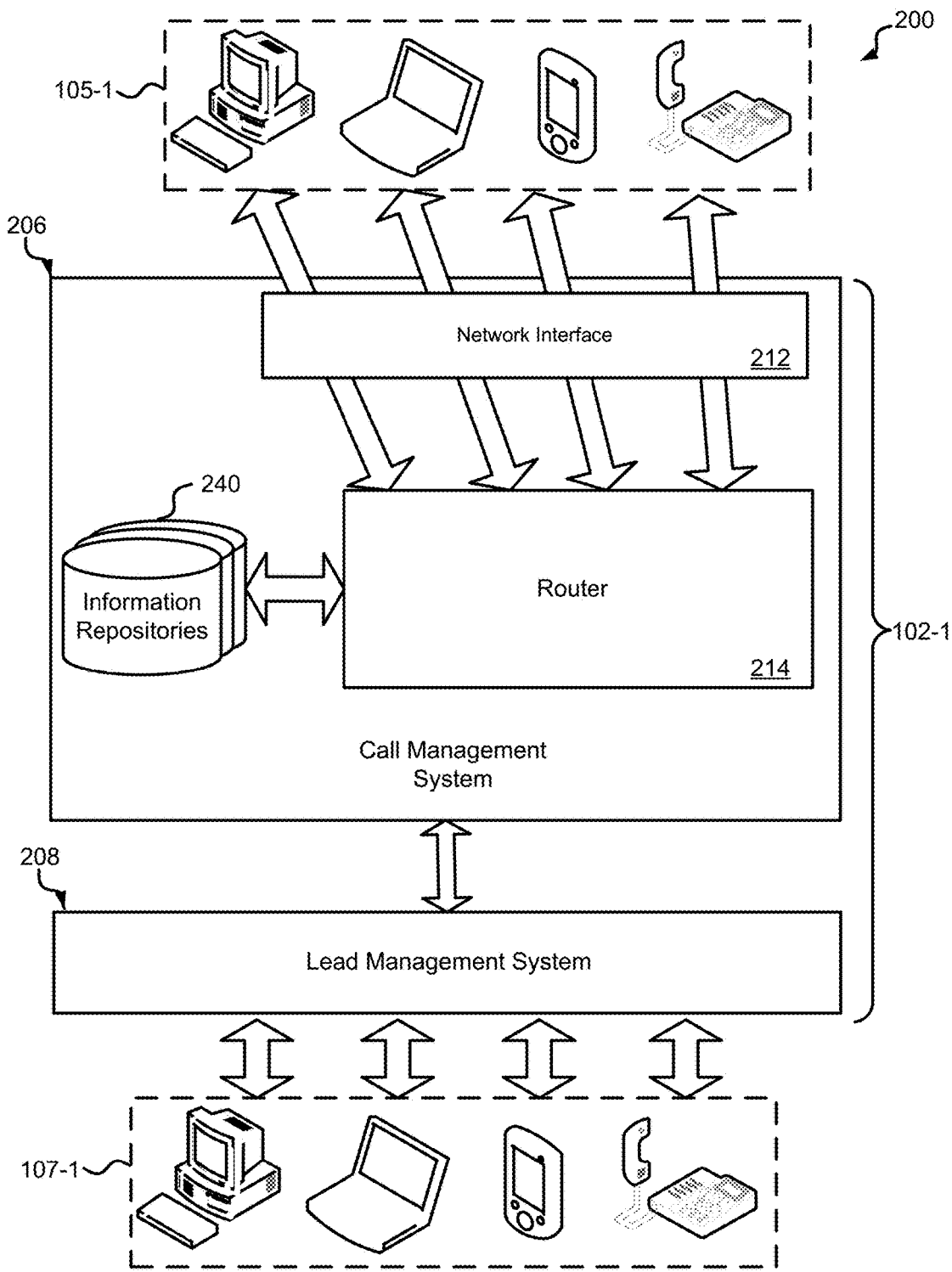
FIG. 2 depicts a block diagram of a management system, in accordance with certain embodiments of the present disclosure.

FIG. 2 depicts a block diagram of a management system 200, in accordance with certain embodiments of the present disclosure. The management system 200 may be configured to allow for routing leads between different advertisers and for qualifying leads in real time. In some embodiments, the management system 200 may be included in the information handling system 102-1. The management system 200 may include a call management system 206 and a lead management system 208.

The management system 200 may include may include logic to implement and/or otherwise facilitate any call handling features disclosed herein. By way of example without limitation, the management system 200 may include one or more call handling modules that may be configured to one or more of decode, route, and/or redirect calls to/from subscribers and advertiser representatives. Similarly, the management system 200 may include one or more message handling modules that may include logic to implement and/or otherwise facilitate any message handling features disclosed herein. While systems, engines, repositories, and other components are described separately herein, it should be appreciated that the components may be combined and/or implemented differently in any combination to provide certain features in various embodiments. In various embodiments, different processes running on one or more shared computers may implement some of the components.

The information handling system 102-1 and/or the management system 200 may be, correspond to, and/or include one or more servers that, in various embodiments, may include one or more switches and/or media gateways, such as telephone, messaging, email, application, and/or other types of gateways. The management system 200 may be configured to determine which communications from end users (e.g., calls) go to which advertisers (and/or vice versa). The management system 200 may include one or more network interfaces 212, one or more processors and memory. In various embodiments, one or more of the processor(s), memory, and/or network interface(s) 212 may correspond to the one or more servers. The network interface(s) 212 may include any suitable input/output module or other system/device operable to serve as an interface between one or more components of the information handling system 102 and the one or more networks 108. The information handling system 102 may use the network interfaces 212 to communicate over the networks 108 using any suitable transmission protocol and/or standard. The one or more network interfaces 212 may be configured to facilitate communication between end-user interface(s) 105-1 and provider interface(s) 107-1. In some embodiments, for example, the communications between end-user interface(s) 105-1 and provider interface(s) 107-1 could correspond to communication between a set of callers and a set of receivers, respectively.

The information handling system 102-1 may include one or more of engines and/or modules that may be stored in the one or more memories and may include one or more software applications, executable with the processors, for receiving and processing requests. The one or more of engines and/or other modules may be configured to perform any of the steps of methods described in the present disclosure. The one or more of engines may include routing engine(s) 214 that may include logic to implement and/or otherwise facilitate any communication handling features discussed herein. By way of example without limitation, the routing engine 214 may be configured to one or more of decode, route, and/or redirect calls to/from end users and advertiser representatives.

The information handling system 102-1 may include one or more data repositories 240. In various embodiments, the data repository(ies) may be implemented in various ways. The data repositories may include database(s), database management system(s), server(s) to facilitate management/ provision/transfer of information, and/or the like. For example without limitation, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information. Various information related to given subscriber/user may be linked in any suitable manner.

Figure 3:
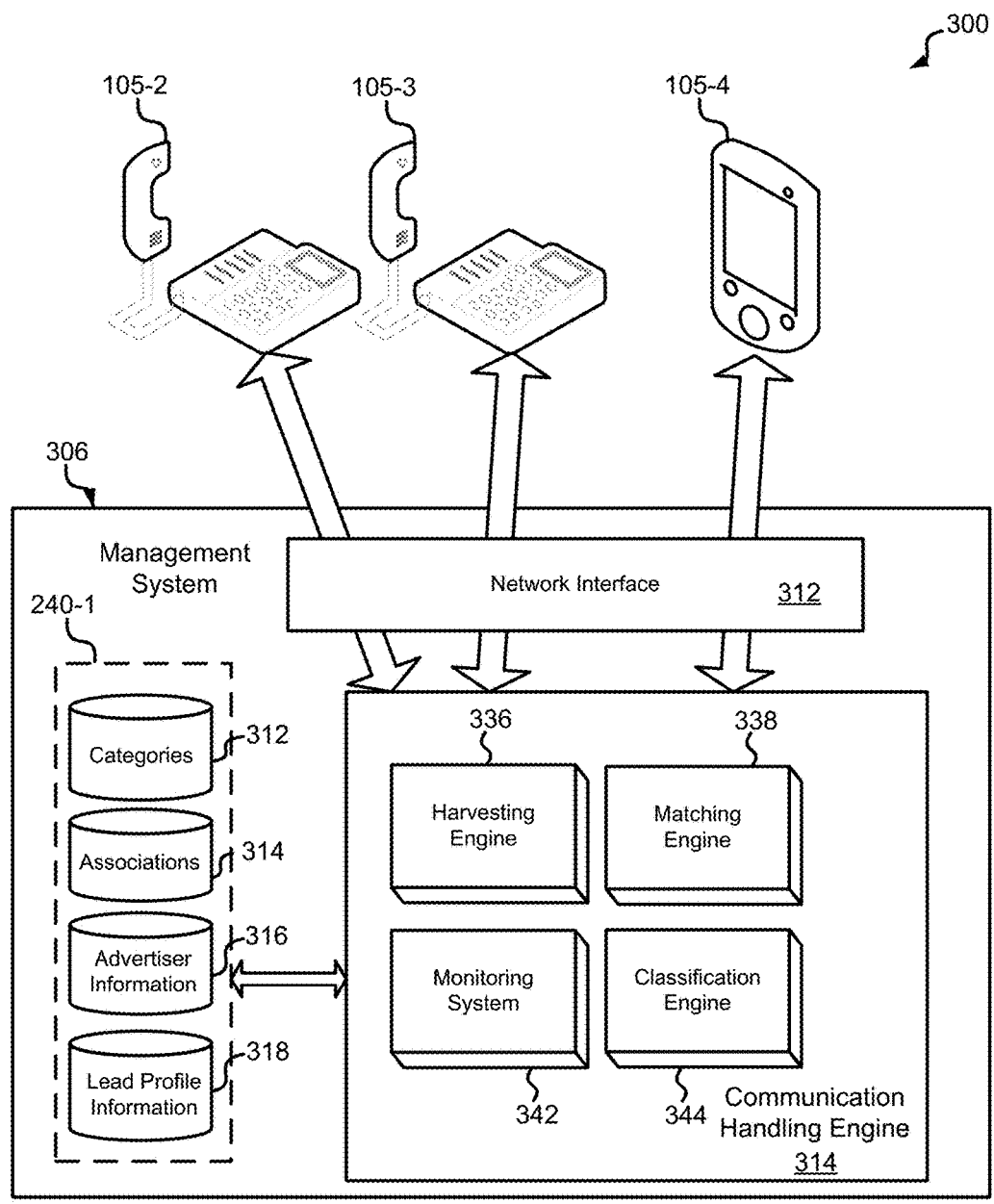
FIG. 3 depicts a block diagram of a routing system, in accordance with certain embodiments of the present disclosure.

FIG. 3 depicts a block diagram of a routing system 300, in accordance with certain embodiments of the present disclosure. The routing system 300 may correspond to the management system 200 in some embodiments, and may include a management system 306 that may correspond to call management system 206 in some embodiments. The management system 306 may include one or more engines, modules, and/or systems configured to perform any of the steps of methods described in the present disclosure. While certain components may be described separately, it should be understood that such component may be implemented in any suitable manner.

The management system 306 may be configured to allow for routing leads between different advertisers and for qualifying leads in real time. The management system 306 may make real-time decisions in order to improve consumer experience and advertiser service. Accordingly, certain embodiments may provide real-time, dynamic routing as a generalized solution.

The management system 306 may include a network interface 312, which may correspond to network interface 212, to facilitate communication with a set of callers using any suitable end-user interface 105. The management system 306 may include a communication handling engine 314, which may correspond to and/or include the routing engine 214 in some embodiments. The communication handling engine 314 may include one or more telephony switches in communication with one or more datastores and the network interface 312. The communication handling engine 314 may be configured to receive inbound calls from callers, determine caller data pertinent to the calls, perform information analysis of the caller data, gather additional caller data as needed, and match callers to advertisers (receivers). Accordingly, the communication handling engine 314 may be or include a call handling engine. In some embodiments, the communication handling engine 314 may include a message handling engine to provide message handling features disclosed herein.

The management system 306 may include one or more information repositories 240. The information repositories 240, which may include category information repository 312, association information repository 314, advertiser information repository 316, and lead profile information repository 318, may retain any suitable information to facilitate certain features disclosed herein. Types of information are disclosed further herein with further description of embodiments using features directed to categories, associations of callers and/or advertisers with certain categories, associations of callers with advertisers, advertiser profiles, lead profiles and qualifications, and/or the like.

A reverse proxy may be used to monitor calls. Phone numbers may be tracked both on the consumer side and on the advertiser side. This stored information may be used to route calls from particular callers to particular advertisers. Phone numbers may be tracked to differentiate good, bad, proximate, and unknown leads. The database 318 storing lead information allows for a more complete picture regarding the leads that may be used for routing customers. Where a particular advertiser is not available, the customer could be routed to others. Like display ads, a reference number for the caller can be used to track how the customer interacts with the caller. In some embodiments, a general vanity number (e.g., 1-800-dentist) may be used, for example. In some embodiments, an icon on a webpage, mobile app, etc. may be provide for user selection to be connected to first available (say, a plumber, for example) that can satisfy the user's request. Accordingly, with certain embodiments, a consumer may not see a number. With some embodiments, a user may provide his phone number, and then the routing system 300 may call that number to join the call with a provider.

Caller Name Service (CNS) may be used to qualify who is good or bad lead. Additional information regarding various embodiments of lead qualification, including lead scoring, lead categorization, caller tracking, location identification, communication references, data logging, call handling, and other lead qualification features, are disclosed in U.S. patent application Ser. No. 13/965,123, filed Aug. 12, 2013 (entitled Systems and Methods for Sales Lead Qualifying, by Jain et al.), which is hereby incorporated by reference.

The communication handling engine 314 may include a harvesting engine 336 configured to harvest information about callers, caller areas, and/or advertisers. The harvesting engine 336 may be configured to perform any one or combination of features directed to facilitating data capture regarding callers, caller areas, and/or advertisers disclosed herein. For example, the harvesting engine 336 may gather and process caller data, which may be specific to a particular caller and/or may be generally related to the caller, which is disclosed further herein. In some embodiments, the harvesting engine 336 may determine additional information needed based on caller data for a given caller. The harvesting engine 336 may gather the additional information. The caller data may be gathered from one or more data repositories of the system, such as a lead profile information repository 318, and/or one or more data sources 110, which could be third-party data sources.

Particular callers may be qualified based at least in part on the caller data gathered. The caller data may be analyzed with respect to individual callers. The communication handling engine 314 may be configured to classify callers into one or more categories based at least in part on caller data. The communication handling engine 314 may include a matching engine 338 configured to perform any one or combination of features directed to matching or otherwise correlating information about callers, caller areas, and/or advertisers disclosed herein. For example, in some embodiments, the matching engine 338 can receive caller information, identify attributes of the caller based at least in part on lead profile information, and match the caller to one or more categories from a category information repository 312. As another example, in some embodiments, the matching engine 338 could match a caller to one or more advertisers based at least in part on correlating categories from the category information repository 312.

The communication handling engine 314 may include a classification engine 344 configured to perform any one or combination of features directed to classifying or otherwise categorizing callers, caller areas, advertisers, and/or advertiser markets disclosed herein. In some embodiments, the matching engine 338 may include the classification engine 344; in other embodiments, the two engines may be separate but work in conjunction with one another.

The communication handling engine 314 may include a monitoring system 342 configured to monitor any suitable aspects pertaining to callers and/or advertisers. For example, the monitoring system 342 may monitor calls routed to particular advertisers in order to assess the success of routing the lead. By way of example without limitation, various aspects of the system 300 may facilitate corresponding features described with the following.

Figure 4:
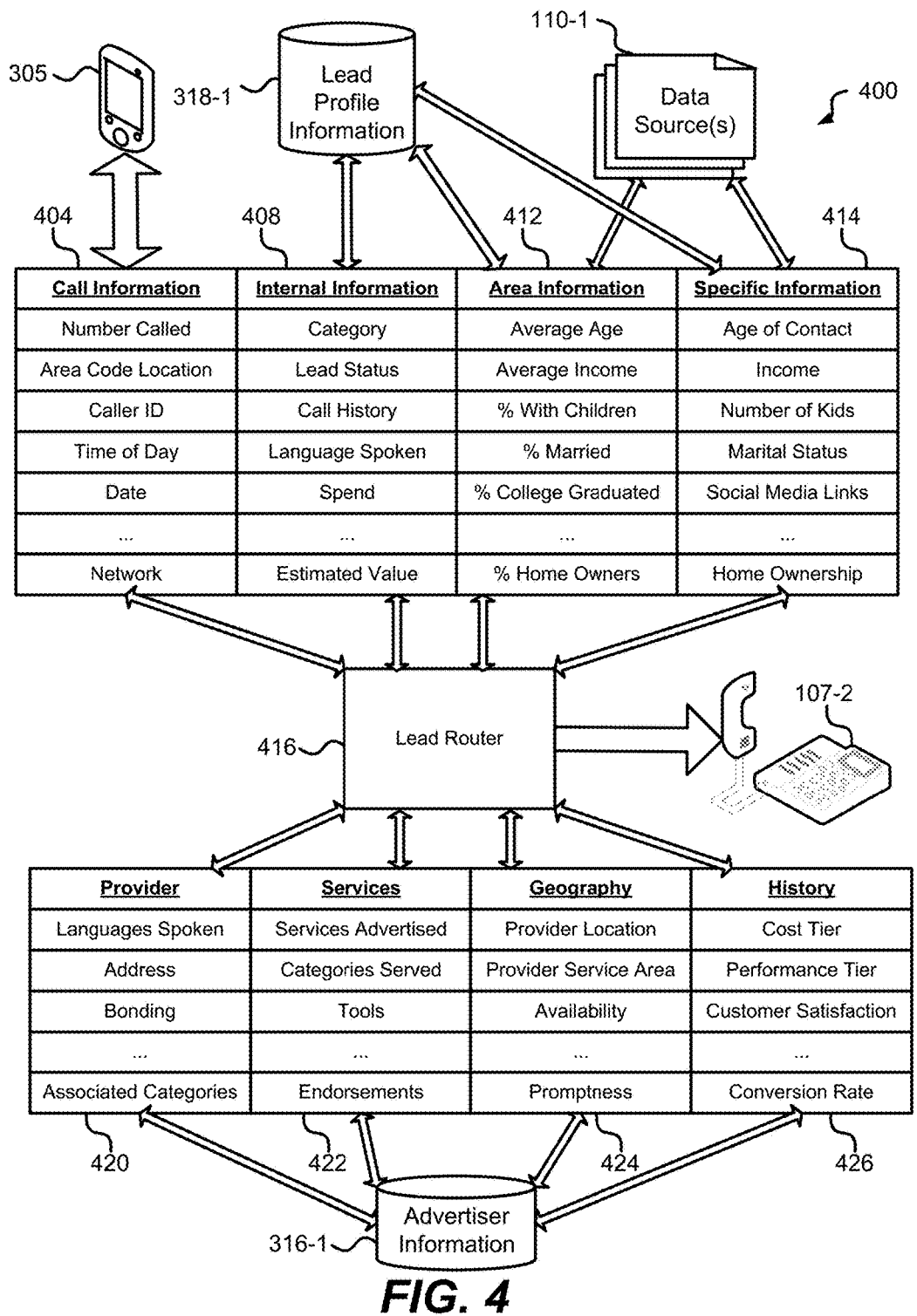
FIG. 4 illustrates certain aspects of lead routing data flow, in accordance with certain embodiments of the present disclosure.

FIG. 4 illustrates certain aspects of lead routing data flow 400, in accordance with certain embodiments of the present disclosure. The lead router 416 may include the communication handling engine 314 and any of various aspects of the management system 306. The communication handling engine 314 may be configured to gather caller data, which may be specific to a particular caller and/or may be generally related to the caller (e.g., information about the caller's location). The caller data may be gathered from one or more data repositories of the system, such as a lead profile information repository 318, and/or one or more data sources 110, which could be third-party data sources. Any suitable categories may be employed for characterization of callers. By way of example, callers may be categorized according to interests, demographics, consumer habits, life stages/milestones, and/or the like to any suitable degree of granularity.

The caller data may include call information 404, such as information about any one or combination of the number called, area code, caller ID, time of day, data, network, and/or the like. The lead router 416 may identify characteristics corresponding to calls based at least in part on a set of call information 404. The lead router 416 may determine additional information based at least in part on the call information 404. The additional set of information may include additional characteristics corresponding to the calls. In some embodiments, the additional information may include additional information, such as call information 404 and/or another type of information such as information 408, 412, 414, and/or the like.

The caller data may include internal information 408, such as information about any one or combination of characterizations, qualifications, attributes, etc. determined by the management system 306. By way of example, such information may concern any one or combination of categories, lead status, call history, language, spend, value, and/or the like associated with the caller. Though the example depicts certain other types of information as separate from the internal information 408, the internal information 408 may include other types of information.

The caller data may include caller-specific information 414, such as information about the contact's age, income, marital status, parental status, social/business networks, home ownership, etc. Thus, the caller data gathering may include capturing demographic data. Any suitable demographic information could be harvested in various embodiments, for example, information about income level, education level, lifestyle, age, family/household, home ownership, etc. The caller data gathering may further include capturing other consumer-specific data. Any suitable consumer specific information could be harvested in order to allow for characterization of a particular caller. For example, such consumer-specific information could include information on whether the caller is proximate to life milestones such as a graduation, a new job, a wedding, childbirth, purchasing a home, etc. Consumer-specific information could include particular purchases or buying habits of the caller, in some embodiments.

Using the phone number, the area from where call originates, population density, average income, age information for the area, the kind of families that live there, history of calls from area to particular categories in particular time periods, and/or the like, the lead router 416 may determine people in the area are facing a particular problem, have a particular need, preference, interest, and/or inclination. Thus, the caller data may include area information 412 pertinent to the location identified for the caller (e.g., information about average age of residents in the area, average income, percentage with children, percentage married, education levels, home ownership, etc.).

With a given call, the number from which the call is made be identified. Information about past calls from the number may be retrieved. Such information may be analyzed to determine if any of the past calls from the number have been made that correspond to the given call. For example, if the given call is made to a plumber, it may be determined if any of the previous calls have likewise been made to plumbers, or businesses relating to plumbing, within a given time period. Say, it is determined that the same caller has made five calls to five different plumbers in the past three days, this could be taken as an indication that the caller has a plumbing issue. Such determinations of multiple recent calls to a particular business category could be correlated to a quality of the lead, and the quality may be considered high given the recent directed activity.

The lead router 416 may identify a need of a caller and then match the caller to a professional. With a generic call to a category of providers, a call-to-service match can be made to find the right professional. Matching can be done based upon any one or combination of proximity, availability of a particular advertiser, screening questions, and/or other bases such as those disclosed herein. Various embodiments may match based at least in part on any one or combination of demographic information, languages spoken, age, and/or the like. In some embodiments, an accent of a caller can be identified and used to match the caller with a professional.

In various embodiments, any one or combination of various types of advertiser information may be used to match a caller with an advertiser. The advertiser information may include provider information 420, such as information on languages spoken, address, bonding, associated categories, and/or the like. The advertiser information may include services information 422, such as information on services advertised, categories served, tools, endorsements, and/or the like. The advertiser information may include geographical information 424, such as information on provide location, service area, availability, promptness, and/or the like. The advertiser information may include history information 426, such as information on cost tier, performance tier, customer satisfaction, conversion rate, and/or the like.

Accordingly, data may be captured on the advertiser side to provide bases for routing calls. For example, how many calls the advertiser and/or advertisers in the same/similar category received, call durations, etc. With some embodiments, information about calls from a particular area can be shown on an advertiser app. For example, the information may indicate that the advertiser received three calls in a certain time period from a certain area, where there is generally more patronage for a certain type of business.

Real-time decisions may be made based at least in part on captured advertiser data. For example, say a particular advertiser is determined to have been routed 20 calls over a particular period and none lasted more than 20 seconds, the lead router 416 may determine that the quality of the particular advertiser is not optimal, and may therefore not send the particular advertiser high-quality leads. The delineations and particular example types of advertiser information are illustrative; any suitable delineations, types, categories, and characterizations may be sued in various embodiments.

In some embodiments, a caller can be associated with the area from which the caller is calling, and more specifically demographic characteristics of the area. Such demographic characteristics can be used as a basis for matching with a professional. For example, the lead router 416 can identify an area from which a call is made, say Redwood City, identify information about that area, say that Redwood City is 50% Hispanic, and that demographic may be used in matching the caller to a professional (e.g., a Spanish-speaking professional). The system may assume that the probability of a call being a lead may be higher if the caller and the receiver speak same language.

In some embodiments, data specific to a caller may be determined to qualify a call. This additional data could be used to better direct the call to an appropriate advertiser. For example, data indicative of the caller being Hispanic could be determined, and, using such information, the caller may be directed a Spanish-speaking advertiser. Previous calls to a non-Spanish speaking advertiser may be determined to have lasted only a relatively short duration. For example, a relatively short call duration of 12 seconds may be correlated to a lower probability of the call being a good lead, whereas a longer call duration of, say, 50 seconds, could be correlated to a higher probability of the call being a good lead.

As another example, calls can be connected based on income area. Hence, the lead router 416 can route calls from a high-income area to advertisers associated with high-income attributes (such as the same and/or similar high-income area, high-income clientele, high-end products/services, and/or the like) in order to increase the probability of the call being converted into a lead.

Some embodiments may allow for markets to be targeted. Various categories may be treated differently, for example, based on any one or combination of demographics, area history, type of area (e.g., suburban residential, urban downtown, etc.), income-level differentiation, and/or the like. As an example, downtown high-rise plumbing may require a different type of plumbing service than suburban residential plumbing. Hence, targeting is different based on category.

As another example, based on calls received for an ad, an age range of the callers can be identified, generally. Say that an age range of responders to a given ad are in the range of 25 to 40, such information can be presented to an advertiser, and the advertiser can understand which demographics the advertiser is capturing versus missing. Such information may be available based at least in part on caller name service.

In some embodiments, missed calls may be recorded, and notifications regarding the missed calls (which may include voicemail recordings, in some embodiments) may be sent out for one or more providers to respond. In some embodiments, the lead router 416 may be configured to determine if a particular provider and/or provide number is no longer in service. Consequent to a determination that such is the case, the lead router 416 may connect a call to alternate provider based on the information analysis.

Figure 5:
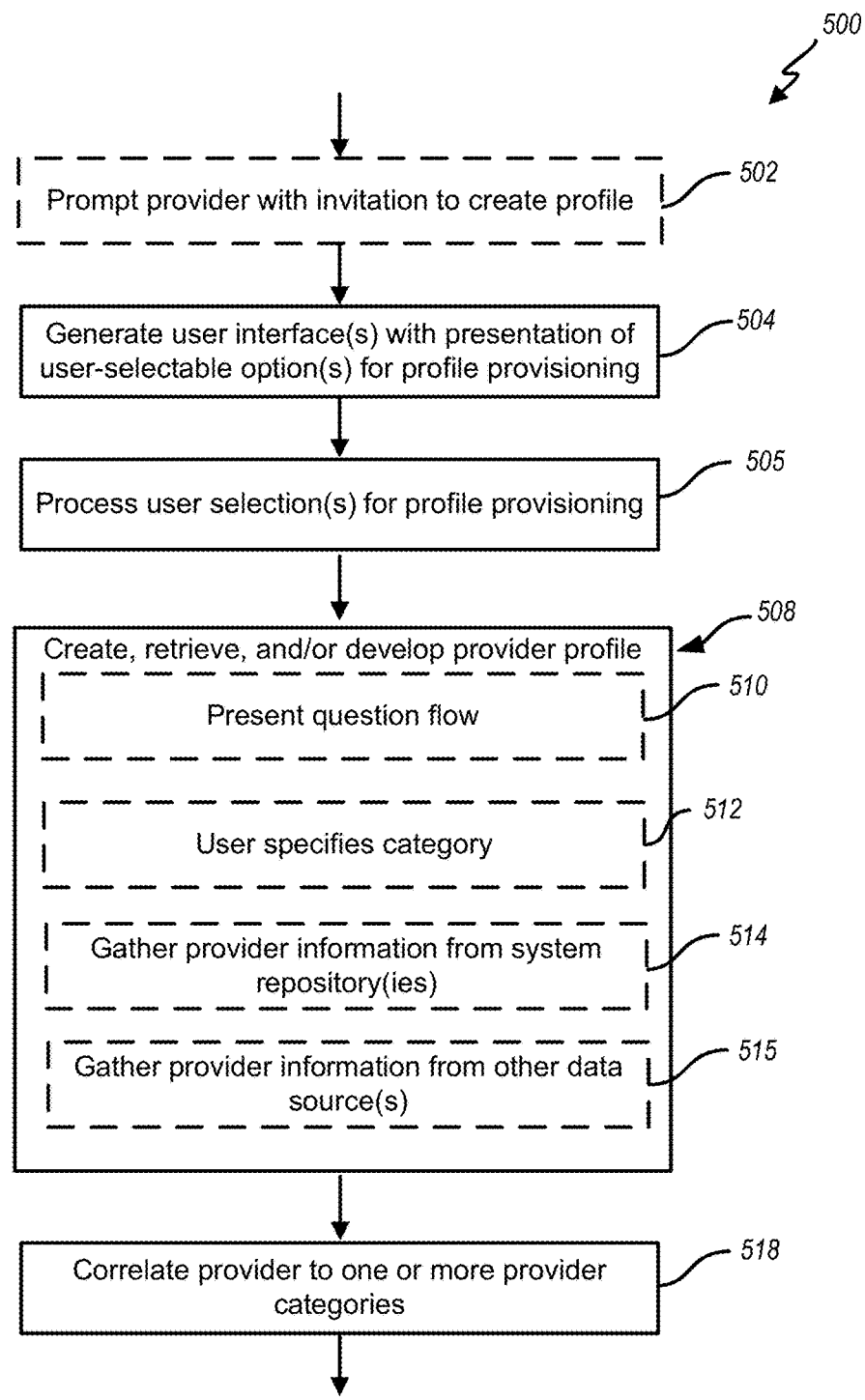
FIG. 5 illustrates an example method of provider onboarding and analysis, in accordance with certain embodiments of the present disclosure.

Advertisers may designate certain preferences with advertiser profiles. For example, a plumber may not want to service anyone from particular areas of a larger metro area, and may explicit indicate such preference via the plumber's profile. FIG. 5 illustrates an example method 500 of provider onboarding and analysis, in accordance with certain embodiments of the present disclosure. Teachings of the present disclosure may be implemented in a variety of configurations that may correspond to the systems disclosed herein. As such, certain steps of the method 500, and the other methods disclosed herein, may be omitted, and the order of the steps may be shuffled in any suitable manner and may depend on the implementation chosen. Moreover, while the following steps of the method 500, and those of the other methods disclosed herein, may be separated for the sake of description, it should be understood that certain steps may be performed simultaneously or substantially simultaneously.

According to one embodiment, the method 500 may begin as indicated by block 502. As indicated by block 502, in some embodiments, a provider may be prompted with invitation to create a profile. An invitation may take any of various suitable forms, and a provider may be identified in any suitable manner. For example, a provider may be identified as already associated with the system but not yet having a tailored profile. Accordingly, in some cases, the system may prompt a provider to initiate profile provisioning. However, in some cases, a provider may initiate profile provisioning.

As indicated by block 504, one or more user interfaces may be generated to provide one or more user-selectable options for profile provisioning. An interface provided by the system may facilitate an onboarding phase. In various embodiments, such an interface may include providing one or more display screens that may each include one or more user interface elements. An interface may include any text, image, and/or device that can be displayed on a display screen for providing information to a user and/or for receiving user input. An interface may include one or more widgets, text, text boxes, text fields, tables, grids, charts, maps, hyperlinks, buttons, lists, combo boxes, checkboxes, radio buttons, and/or the like.

As indicated by block 506, one or more user selections for profile provisioning may be processed. The user selections may include initiations of the onboarding and/or provisioning process. The user selections may include selections corresponding to provider information and/or preference gathering.

As indicated by block 508, a provider profile may be created, retrieved, and/or developed. Information enabling unique identification of a provider may be gathered, processed, and retained. Profile information may be gathered with respect to a particular provider as part of the onboarding process. In some embodiments, the onboarding may include a provider registration and/or certification stage. In some embodiments, one or more automated process flows may facilitate the provisioning of prospective providers with accounts and registration. Accounts may be created in various ways in various embodiments. For example, account creation may be initiated by the system. The system could initiate onboarding by automatically identifying the provider and presenting a communication reference, such as a link, inviting the provider to register and create an account. The onboarding may include a profile stage, which may include a process of ensuring profile completion. A profile may include information regarding a provider's certifications, permits, licenses, experience, hours of availability, specialties, proficiencies, types of payments that are receivable, contact information, notification preferences, device configurations/capabilities, billing information, certification information, information on locations, and/or the like. A profile may include persistent information that is maintained about a provider. A profile may include any data stored in an information repository whether or not it is part of the profile exposed to a provider. With the profile, a provider may be able to indicate specific services/products which the provider is to provide. The provider could also indicate, implicitly or explicitly, specific services/products which the provider does not provide.

In some embodiments, the profile may include a notification profile. The notification profile may specify parameters for notifying the provider, and could also specify parameters for provider responses to notifications from the system, such as a notification regarding missed calls, voicemails, call recordings, etc. In some embodiments, advertising platform may send a notification to a provider, which notification, for example, could be provided via a provider dashboard provided via the platform. However, any suitable means of notification may be employed. For example, text, voice, e-mail, alerts with the application, and/or the like could be sent. The notification could include a link or other communication reference referring back to the platform, prompting the provider to respond. For example, the notification could provide a link for users to log into the platform to respond. In some embodiments, the provider may respond via the same medium in which the notification was sent (e.g., text, voice, e-mail, etc.), and the system may process the response, extracting requested information.

In some embodiments, as indicated by block 510, one or more questions may be presented to the provider to gather provider information. An automated workflow may include a series of questions, the answers to which, as provided by user selections, may be used for provider analysis, e.g., to identify one or more attributes/characteristics of the provider, to categorize the provider, and/or to otherwise characterize the provider. In some embodiments, as indicated by block 512, the provider may specify or otherwise indicate one or more categories to which the provider belongs. Some embodiments may present information and user-selectable options to facilitate categorization of the provider.

Additionally or alternatively, as indicated by block 514, provider information may be gathered from one or more information repositories of the system. In some cases, the provider may have been previously associated with the system such that certain provider information has already been gathered and retained. Thus, previously identified provider information may be accessed to facilitate analysis of the provider. Additionally or alternatively, as indicated by block 516, provider information may be gathered from one or more other data sources. Some embodiments may provide for porting of information from a provided-managed repository of information. Some embodiments may provide for options for user initiation of porting information; some embodiments may perform the process automatically. In various embodiments, provider information may be gathered from any suitable data source, which may include any one or more or combination of a database, a website, any repository of data in any suitable form, and/or a third party. According to certain embodiments, provider information may be actively gathered and/or pulled from data sources, for example, by accessing/crawling a data source repository.

As indicated by block 518, the provider information may be correlated to one or more provider categories. In some embodiments, the classification engine 344 and/or matching engine 336 that can receive provider information, identify attributes of the provider based at least in part on the provider information, and match the provider to one or more categories from the category information repository 312. In some embodiments, one or more taxonomies that map particular profile information to particular categories may use in correlating provider profile information with one or more categories.

Figure 6:
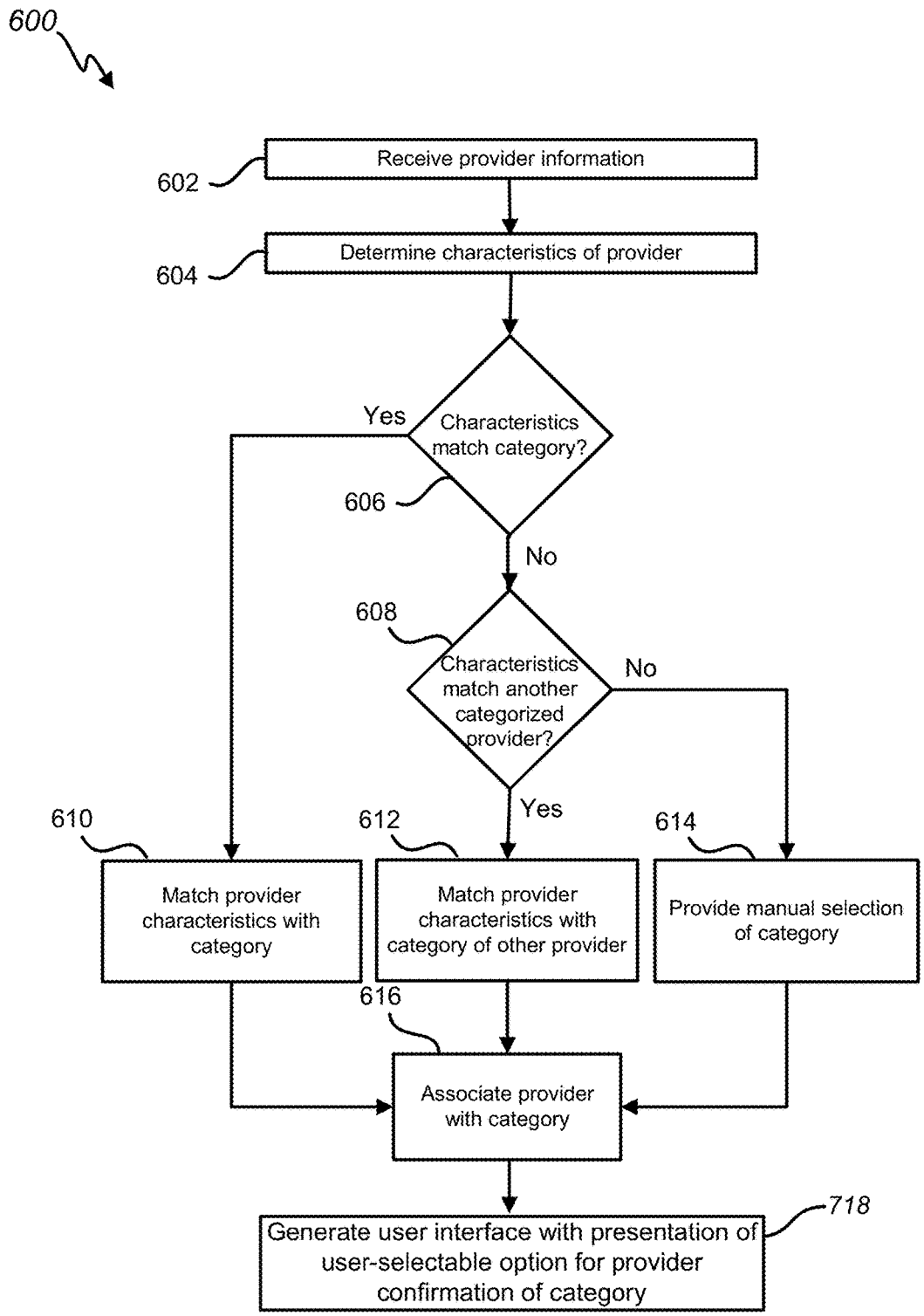
FIG. 6 illustrates a flowchart of a method of provider categorization, in accordance with certain embodiments of the present disclosure.

FIG. 6 illustrates a flowchart of a method 600 of provider categorization, in accordance with certain embodiments of the present disclosure. This and/or other methods disclosed herein may be performed in whole or in part by the information handling system 102 and/or a client application, and may be facilitated the provider interface(s) 107. As indicated by block 602, provider information may be received. For example, the system may receive provider information as disclosed herein.

As indicated by block 604, one or more characteristics of the provider may be determined. For example, the system may determine characteristics such as products or services provided, customers served, market, location, etc. based on the provider information gathered. As indicated by block 606, it may be determined whether one or more of the characteristics match characteristics associated with one or more categories. If so, as indicated by block 610, one or more provider characteristics may be matched with one or more categories. Then, as indicated by block 616, the provider may be associated with the one or more categories. Information about the categorization of providers may be retained by the system, for example, in one or more information repositories.

However, if it is not determined that one or more of the characteristics match characteristics associated with one or more categories, it may be determined whether one or more of the characteristics match another already categorized provider, as indicated by block 608. The one or more characteristics can be compared with other providers. If characteristics match with a second provider exceeds a threshold, the provider can be determined to match with the category of the second provider, as indicated by block 612. Then, as indicated by block 616, the provider can be associated with the category of the second provider.

However, if it is not determined that the provider characteristics match other provider characteristics, a representative can provide a manual selection of a category, as indicated by block 614. In some embodiments, manual selection can be made by a representative associated with the system; in some embodiments, manual selection can be made by the provider (which term, as used herein, includes representatives associated the provider). A manual selection having been made, the provider can be associated with the selected category, as indicated by block 616. In some embodiments, as indicated by block 618, a user interface with presentation of user-selectable option(s) may be generated to allow for confirmation of the one or more categories. The user interface may be exposed to the provider for provider confirmation.

Though service, service provider, service provider categories, and/or the like are referenced herein as bases for features of embodiments herein, it is to be understood that one or more other bases could be used in addition or in alternative. For example, product, property, business, corresponding providers, corresponding categories, and/or the like could be a basis for features in addition or in alternative to service. Thus, references herein to service, service provider, service provider categories, and/or the like are not to be construed as necessarily limiting embodiments to those aspects. Furthermore, in certain embodiments, any one or combination of advertiser, service representative, business, publisher, product provider, property provider, and/or the like may be the same entity.

Figure 7:
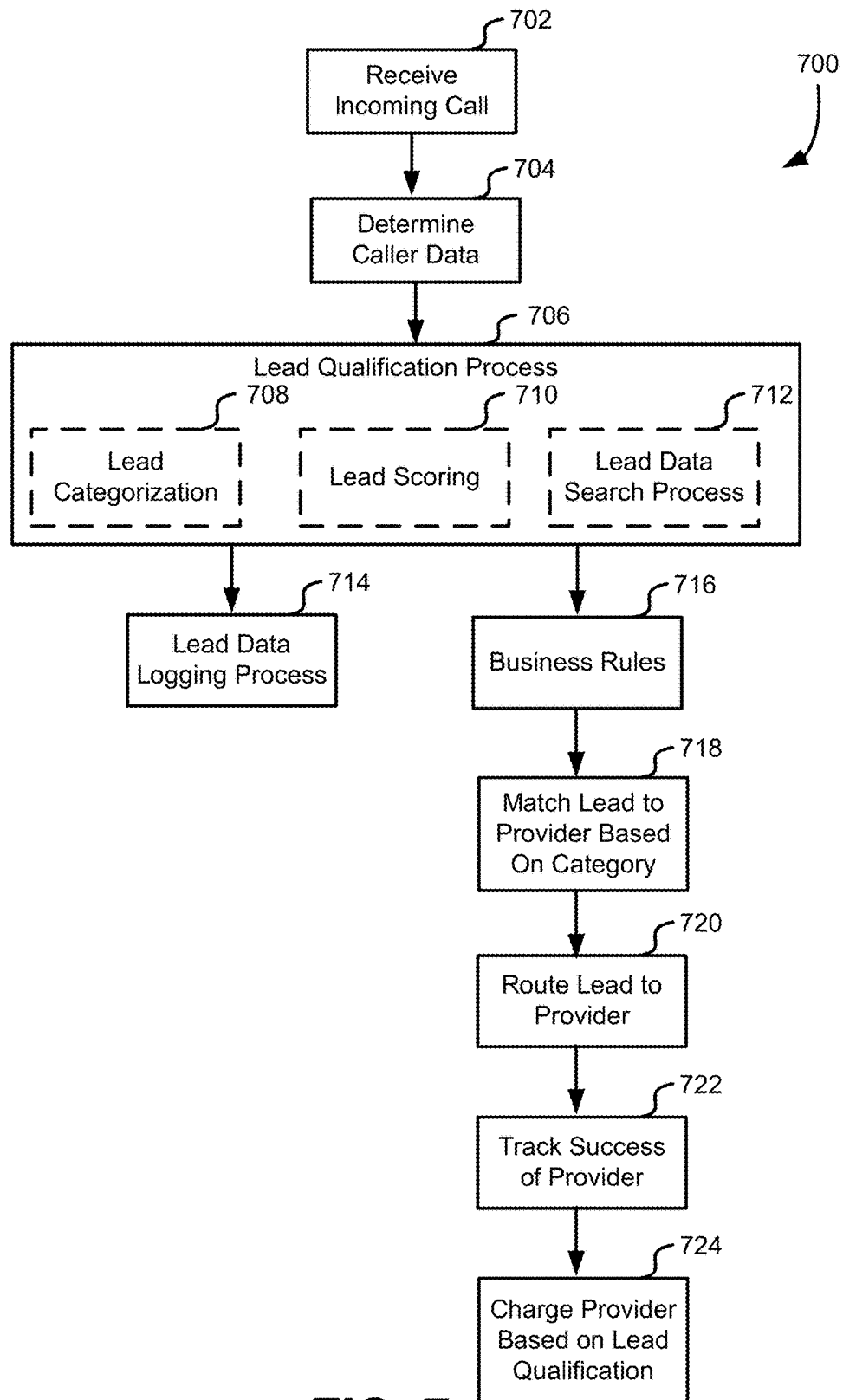
FIG. 7 depicts a functional block diagram of certain aspects of lead routing, in accordance with certain embodiments of the present disclosure.

FIG. 7 depicts a functional block diagram of certain aspects of lead routing 700, in accordance with certain embodiments of the present disclosure. As indicated by block 702, an incoming call may be received. As indicated by block 704, caller data may be determined. Call data may be determined as disclosed herein. The caller data may be gathered from the caller interface 105, a client application installed on the caller interface 105, one or more data repositories of the system, such as a lead profile information repository 318, and/or one or more data sources 110, which could be third-party data sources.

As indicated by block 706, having caller data, the system may implement a lead qualification process. Various embodiments may employ any one or combination of various methods of qualifying leads. Some embodiments may include lead qualification determined prior to the call, such as qualification of the caller based on previous calls, area information for the area pertinent to the caller, and/or caller-specific information previously captured (e.g., from data source(s) 110). In some embodiments, such predetermined lead qualification may be updated with caller data captured responsive to the call. In some embodiments, lead qualification determined solely based on caller data captured responsive to the call.

Some embodiments may qualify a lead according to a graduated lead scale. Any suitable lead scale may be used in various embodiments. In some embodiments, a lead scale could entail a categorization scheme 708, with categories such as good lead, neutral, and non-lead, or any suitable categories such as categories based on call information 404, internal information 408, area information 412, and/or specific information 414.

In some embodiments, a lead scale could entail a lead scoring system 710. The lead scoring system 710 could be correlated to the category scheme in some embodiments, such that certain scores correspond to certain categories. Some embodiments may score a lead with a numerical expression, for example, a lead score. For example, in some embodiments, a caller calling a representative of a service provider may be evaluated for lead potential. A lead score may be an assessment of a caller's potential to be a good lead. Accordingly, a lead score may indicate which callers are more likely than others to bring in business, thus providing a quantitative estimate of the probability that a given caller will provide business. By way of example without limitation, a lead scale could include a range of lead scores from 0 to 100, or from 0 to 1,000, with the high end of the scale indicating greater probability. Some embodiments may use methods of statistical analysis to derive a lead score. Various embodiments may determine a lead score based on any one or more suitable quantifiers.

In some embodiments, the system may implement a lead data logging process 714. Lead information about a caller may be retained as a lead profile, with a new profile being created or a preexisting profile being updated. A lead profile may include indication of the corresponding caller as having a record qualified according to a lead scale. The lead qualification process 706 could take into account previously logged lead data about a caller. Thus, the system may implement a lead data search process 712. Accordingly, certain embodiments may provide for reliable identity matching and lead qualifying in view of historical data about callers.

Action may be taken with respect to the lead qualification based at least in part on business rules 716. As indicated by block 718, the lead may be matched to a provider based at least in part on category matching. Various embodiments may employ any one or combination of various methods of determining matches for particular callers and particular providers based at least in part on caller characteristics, area characteristics, and/or provider characteristics, such as the lead profile information and the advertiser information of FIG. 4. In a set of embodiments, matching could be based at least in part on any one or combination of the caller and/or provider attributes disclosed herein, such as location, caller demographics, area demographics, caller preferences, provider preferences, caller history, provider history, etc. In some embodiments, one or more aspects of the matching may correspond to assessing/ranking/scoring relevance of caller categories and provider categories in various embodiments discussed herein. Scoring can be based at least in part on category. In some embodiments, the matching may be implemented as a decision tree. In some embodiments, explicit preference information of the caller and/or advertiser may be weighted more heavily than other considerations. In some embodiments, information more specific to the caller may be weighted more heavily than general considerations.

Certain embodiments may identify matches based at least partially on similarities of characteristics of a caller and characteristics of a provider. Any suitable algorithm for assessing similarity may be employed. Some embodiments may identify intersections between multiple sets of characteristics. Having set intersections identified, the intersections may be compared. A greater extent of an intersection may be an indication of a greater degree of similarity between a caller and a provider, relative to other intersections involving other provider(s). In some embodiments, the sets may be ranked according to the extent of the intersections. Correspondence could be scored based on proximity of providers to a relevant location of interest of the user. In some cases, only matches with a predetermined correlation threshold may be considered for selection. In some embodiments, the system may rank providers according to correspondence to select one provider. In some embodiments, lead qualification may allow the delivery a good leads to those advertisers willing to pay for them. Thus, certain embodiments may route calls according to both lead qualification of the calls and correlation to advertisers able to provide service to callers.

As indicated by block 720, the lead may be routed to the selected provider. As indicated by block 722, the success of the provider may be tracked. And, in some embodiments, the provider could be charged based on the lead qualification, as indicated by block 724. Account management/billing module(s) could implement a code system by which an advertiser is charged based on the lead qualification. For example, an advertiser could be charged only for good leads and/or not charged for bad leads. The charging process could be a performance-based system where charges are accrued on a per-call basis.

How an advertiser is charged can be differentiated in certain embodiments. An advertiser can be charged based on categories associated with cost of job rules. For example, cost of job rules can be different for a plumber as compared to an auto body shop.

In some embodiments, the charges could be based on lead score. Charges could be proportional to lead score in some embodiments. Charges could be applied contingent on one or more thresholds. For example, a minimum threshold could be employed, where a lead score not meeting the minimum threshold could result in no charge. A lead score above the minimum threshold could result in a charge. The charge could be based on one or more score bands, for example, one or more score bands above the minimum threshold. By way of example, a lead score above a 50% minimum threshold could be correlated to quartile bands. A discounted charge could be applied to a call will be a lead score correlated to a 50-75% band. A full charge could be applied to a call will be a lead score correlated to the 75-100% band. Some embodiments could implement a proportional charge, such as a lead score correlated to 75% could result in a charge of 75% (or some other proportion) of the full charge.

Figure 8:
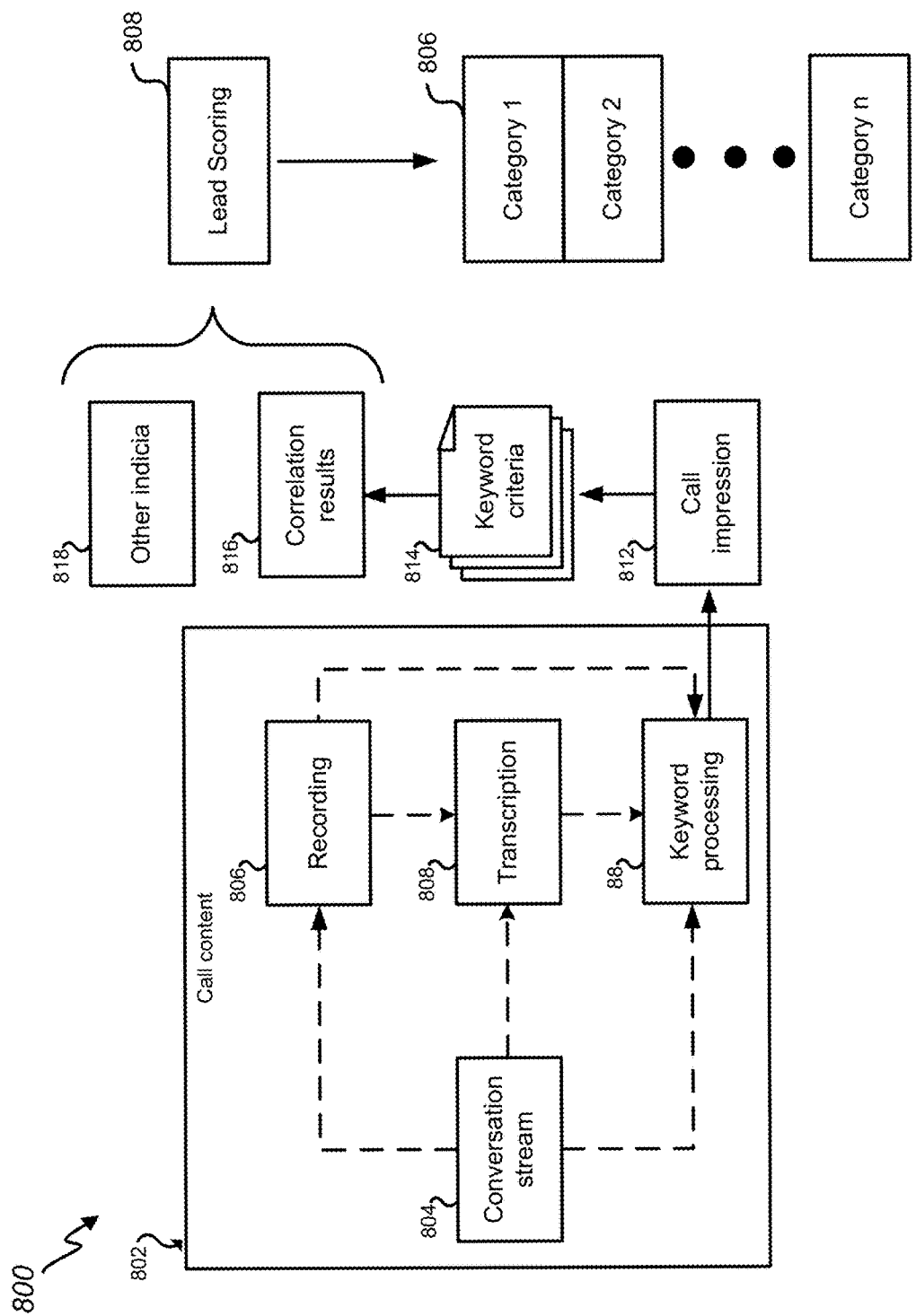
FIG. 8 depicts a functional block diagram of certain aspects of content-based lead data capture and lead qualification, in accordance with certain embodiments of the present disclosure.

FIG. 8 depicts a functional block diagram of certain aspects of content-based lead data capture and lead qualification 800, in accordance with certain embodiments of the present disclosure. Call content 802 may be captured by the application(s) of an interface 105 and/or 107, and/or by the information handling system 102. In some embodiments, a communication device 105 and/or 107 provides a conversation stream 804. The conversation stream 804 could be provided to the system 102 for further processing. Certain embodiments may use recordings 806 of calls to determine if calls are leads or not. Calls can be recorded 806 on the communication device 105 and/or 107 in some embodiments. In other embodiments, calls can be recorded 806 on the backend system 102, particularly in embodiments where calls are proxied through the information handling system 102.

Certain embodiments may provide for transcription 808 of calls. Calls could be transcribed 808 by the client application or by the backend system 102 either of which may be configured to record calls. A transcription engine could process recordings of calls. In some embodiments, transcriptions 808 could be based on recordings 806; in other embodiments, the conversation stream 804 could be processed directly to generate transcriptions 808.

Certain embodiments may provide for keyword processing 810 of calls. In some embodiments, a call impression engine could process transcriptions 808 for keyword identification 808. However, in some embodiments, rather than transcribing calls verbatim, a call impression engine could process keywords directly from a conversation stream 804 or from a recording 806. The call impression engine could be configured to recognize communication content/form that is evidence of lead potential. Certain keywords may be indicia of a lead. Lead scores 808 of calls may be based at least in part on keywords used in the calls.

The impression engine may identify keywords as distinctive markings and could compile the keywords as a call impression 812 for the purposes of characterizing the call from the perspective of lead potential. The call impression 812 could be retained in any suitable form, such as a file, a list, etc. The keywords could be correlated with keyword criteria 814 to characterize the call from the perspective of lead potential and generate correlation results 816 that can be taken into account with lead scoring 808. In some embodiments, the correlation results 816 can be taken into account in conjunction with other indicia 818, which could correspond to any one or combination of the other indicia of lead potential disclosed herein and/or the like.

Certain embodiments may provide for a privacy overlay to maintain a barrier between captured content of calls and humans. Some embodiments could provide for privacy mechanisms such as, for example, machine review of calls only. Recordings 806 of calls may not be returned to a human in some embodiments. In some embodiments, recordings 806 of calls may be processed such that the recordings 806 are not human-readable. For example, in some embodiments, recorded call content 806 could be randomized such the recordings 806 are not human-readable.

Some embodiments could retain only select keywords 812. The retained keywords 812 could correspond to distinctive indicia that provides evidence of lead potential. In some embodiments, call analytics could be performed in real time such that recordings 806 are not necessary and voice recognition would suffice to capture keywords. Thus, the keywords could be retained as metrics for a call. In some embodiments, the keywords 812 could be selected such that the call could not be reconstructed based on the keywords 812. In some embodiments, where keyword processing 812 is based on transcription 808, transcriptions 808 could be scrubbed after keyword capture such that only the keywords 812 are retained. In some embodiments, the recordings 808 may be archived for a predetermined period of time. Accordingly, certain embodiments may obviate the need for any announcement that typically indicates that a call may be recorded for quality reasons or for training purposes or the like.

Figure 9:
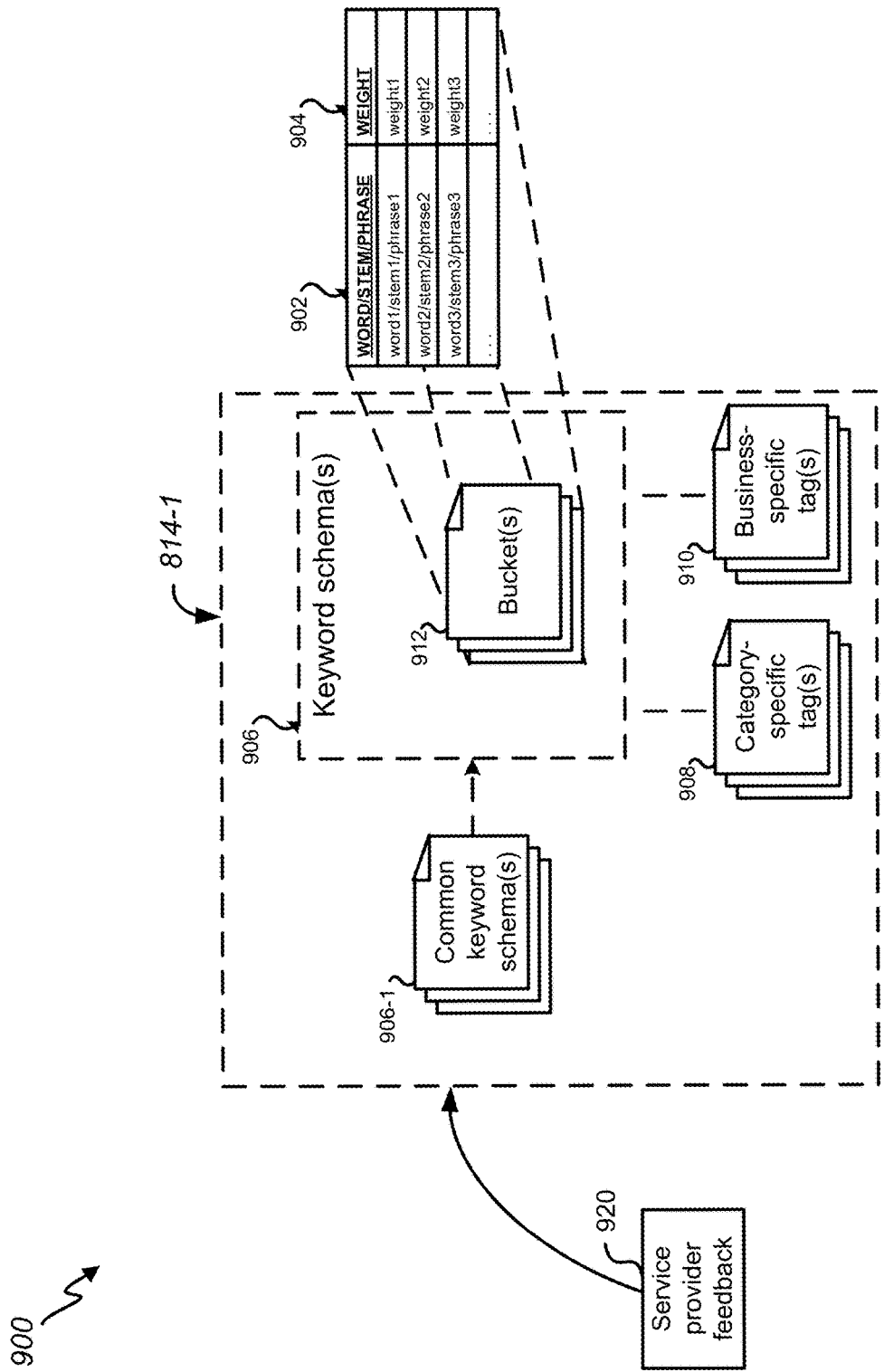
FIG. 9 depicts a functional block diagram of certain aspects of content-based lead data capture and lead qualification, in accordance with certain embodiments of the present disclosure.

FIG. 9 depicts a functional block diagram of certain aspects of content-based lead data capture and lead qualification 900, in accordance with certain embodiments of the present disclosure. The keyword criteria 814-1 could include keywords identified by any one or combination of words, word stems, phrase, word groupings, and/or like keyword information 902. The keyword criteria 814 could include weighting 904 assigned to words, word stems, phrase, word groupings, and/or the like. For example, a keyword 902 could be assigned a weight 904 according to its significance. Increased word weights 904 could be tied to increasing probability that the caller is a good lead. Keyword repetition during a call could be recognized and could increase the lead score, with certain keyword repetition being tied to increasing probability that the caller is a good lead.

The keyword criteria 814-1 could correspond to one or more keyword schemas 906 that are correlated to various call scenarios. Thus, in some embodiments, keywords of a call impression 812 could be matched with a keyword schema(s) 906. Various keyword schema(s) 906 could be correlated to various call scenarios. For example, some embodiments may provide for wrong number detection. The keywords "wrong number" may well indicate that a caller called the wrong number. Such evidence could be coupled with other indicia 818 further corroborating the evidence that the call was made to the wrong number. A relatively short call duration, for example, could be such corroborating evidence and such a call may be considered to have a high likelihood of being a non-lead. As another example, the callee responding with keywords "not interested" or the like may indicate that the caller is a telemarketer.

Some keywords may mean a buying call in one context but not in another. Different keyword schemas 906 could be tailored to different contexts. Accordingly, certain embodiments may provide for contextual discrimination so that keywords are accurately correlated with a good lead in the proper context, but are not correlated with a good lead in another context. Keywords could be categorized by service provider category into category-specific keyword lexicons. Keywords could be gathered for any sort of profession and grouped into a specific keyword schema 906. For example, if somebody is calling a restaurant and just talks for a few seconds, considering the duration alone would not be an accurate indication of whether the call is a lead. However, if the caller asks, "Are you open," and the callee says, "Yes, we're open," such a call is a valid lead, although it was such a short call, because of the keyword indicia. Similarly, keywords associated with asking for directions, making a reservation, etc., could be strong indicia of good leads for a restaurant business. Category-specific tags 908 or any other suitable means of linking could be used to associate category-specific keyword schemas 906 to specific categories. For example, each business could be tagged and tied, for example, via code system to a business-category-specific schema 906. Business-specific tags 910 or any other suitable means of linking could be used to associate business-specific keyword schemas 906 to specific categories. For example, each business could be tagged and linked, for example, via code system to a business-specific schema 906.

In some embodiments, a keyword schema 906 could include word buckets/sets 912 of good words, bad words, and/or neutral words, that is, keyword information indicative of a lead, keywords indicative of a non-lead, and/or keyword that are not useful as indicia. The word buckets 912 could be tailored to each category and/or business. In some embodiments, each category may have three word sets 912 associated therewith, one for good words, bad words, and/or neutral words. Other embodiments may simply have a good word set, or a good word set and another word set.

Within each word bucket 912, various words could be assigned various weights according to their significance. Such word buckets 912 could be implemented in any suitable manner, including word lists, word tables, matrices, and/or the like. And within a bucket 912, keywords could be organized in a rank order and/or any auditable hierarchical structure according to weight. Some embodiments may have keywords organized according to decision tree, with contingencies so that only certain combinations of keywords may be considered. For example, certain keywords could only have significance if used in conjunction with other keywords, and/or not in conjunction with others. Some contingencies could be implemented so that only a threshold cumulative weight and/or keywords need be identified to score the call. For example, the top five keywords having the greatest weight of all the keywords within a bucket may cumulatively meet or exceed a minimum threshold of cumulative weight so that further processing of keywords and/or the call need not be performed if hits for the top five keywords are found for the call.

Some words, however, may be common to multiple service provider categories/business, e.g., common keywords that may indicate a caller ready to buy or ready to come into a business location, wrong number detection, etc. Some embodiments may enforce common keyword schema(s) 906-1 to address such situations. Such words could likewise be assigned various weights according to their significance. The common keyword schema(s) 906-1 could be used preliminarily or otherwise with respect to other keyword schema(s) 906, such as more specific schema(s) 906.

Certain embodiments may adapt over time to modify inclusions in word buckets 912. Certain embodiments could apply a heuristic approach to adaptation. Adaptation could be based on which words are more frequently used words for buyers of a particular service. Similar calls could be analyzed together to find statistical characteristics of keywords used. The keywords could be ranked to assign greater weight to the more frequently used words. Such analyses could be performed on service provider basis, a service category basis, a location basis, and/or the like.

Certain embodiments may provide a service provider with feedback options 920 regarding callers and lead potential. User-selectable options (via pop-up, the advertiser platform/ dashboard discussed herein, and/or the like) could be provided to allow a service provider to rate a caller to indicate lead potential, designate the call as a lead, non-lead, wrong number, etc., and/or to otherwise provide feedback information about a call that the service provider received. Accordingly, the system could confirm which calls actually lead to a sale, are otherwise good leads, are bad leads or non-leads, etc. The feedback 920 could be used for training the system to heuristically adapt word sets. In view of the feedback 920 regarding specific calls, the call recordings 806, transcriptions 808, and/or call impressions 812 could be analyzed to identify keywords therein. For example, if a call was identified as a good lead and the call contained a particular set of keywords, and the service provider confirmed that call was a good lead, then a subsequent having a similar set of keywords could be analogized to the earlier call to conclude that the subsequent call is likely a good lead. This could be particularly beneficial in businesses that are relatively unique or that have callers difficult to differentiate from a lead perspective.

In some embodiments, a personalized profile of a service provider may be associated with one or more keyword schemas 906. The particular service provider could have an individually customized keyword schema 906. Customizations could involve screening out calls with keywords that are distinctive to a particular service provider. For example, personal calls of the service provider, say with the service provider's spouse, could be excluded. Keywords indicative of personal calls, say terms of endearment, could be identified, and the associated caller phone number could be retained on an exclusion list so that any calls from that particular number are automatically and preemptively screened out as non-leads and not subject to lead processing. The evidence of calls be of personal nature may include repetition of calls and/or times of day that the calls are made. This could be considered as corroborating evidence, as in some cases what might be considered a term of endearment in one context, say "Honey," might be a common manner of speaking in another context, such as where, in some regions, "Honey" and "Hun" are used by some individuals even when directed at strangers.

Over time, both positive words and negative words could be accumulated, identified, and used to process calls more effectively. In addition, there may be identified words that could simply be ignored as not being indicative of anything. Words of little or no significance to the lead qualification process could be screened out.

Certain embodiments may provide for accent recognition. Accent recognition may allow for more accurate lead qualification. Not only would the data capture be more accurate, but also the recognition of a particular accent could be used in the qualification process to adjust the lead score. For example, the recognition of a particular accent may allow for demographic characterization of a caller.

In some embodiments, a client application installed on the communication device of the service provider can be configured to manage multiple phone numbers. Some service providers may give out one phone to customers and one to personal contacts. There may be a virtual number and a regular phone number. Thus, calls to multiple phone numbers could ring the communication device. The application could differentiate between calls coming in to each of multiple phone numbers to disregard personal calls but process business calls. In some embodiments where the backend system routes the call to the mobile communication device, the system may notify the application on the mobile communication device that the call should be processed as a non-personal call. The backend system 102 could notify the application that a call is a personal call.

Figure 10:
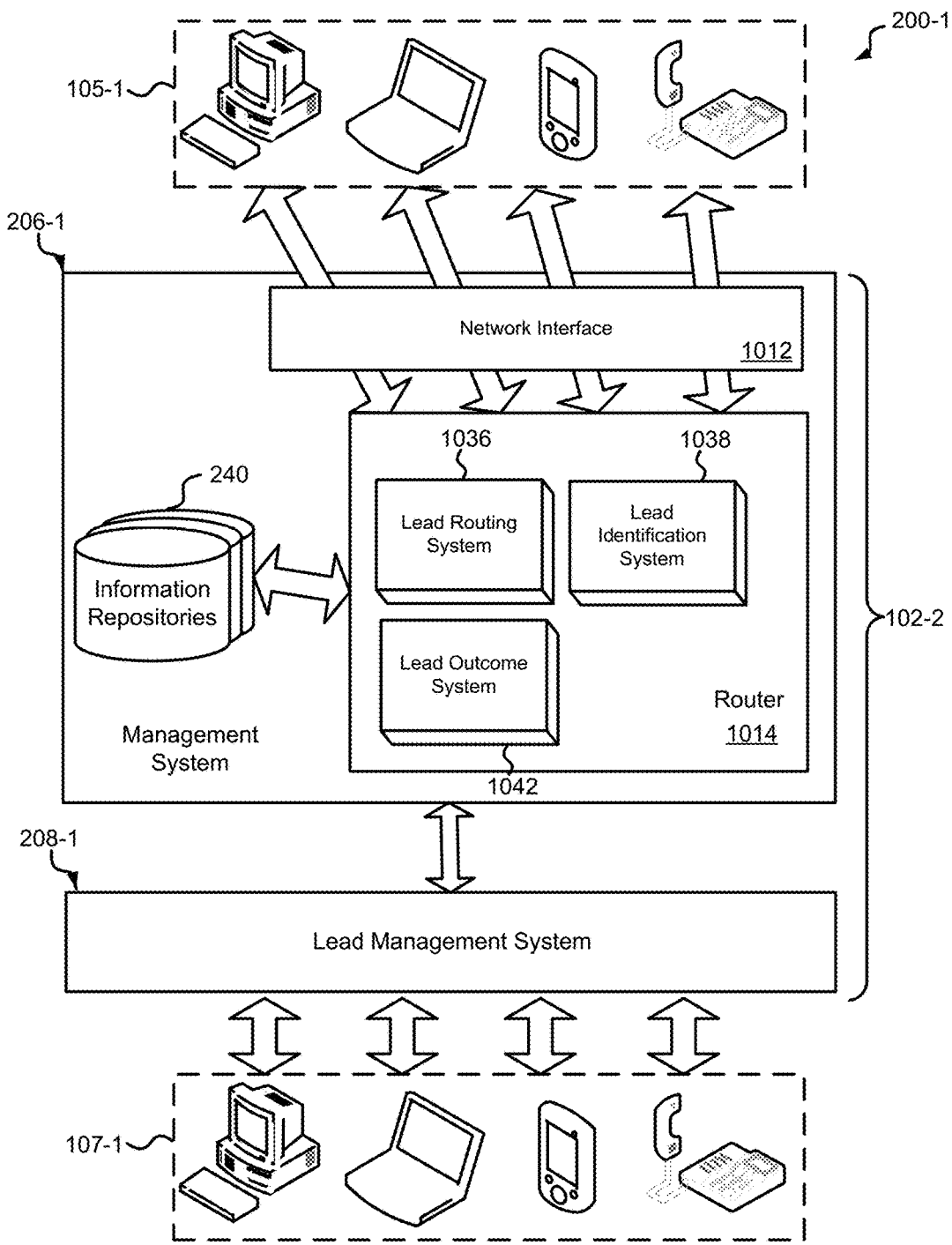
FIG. 10 depicts a block diagram of a lead propagation control system, in accordance with certain embodiments of the present disclosure.

FIG. 10 depicts a block diagram of a lead propagation control system 200-1, in accordance with certain embodiments of the present disclosure. Certain embodiments may provide for identifying the status of a lead after the lead has been routed to a service provider. Certain embodiments may provide end-to-end integration of ad campaign provisioning, lead delivery, lead tracking, and lead nurturing to grow existing and new customer bases. Accordingly, certain embodiments may add customer relation management features post lead routing. After the caller goes with a service provider, the lead status may be updated accordingly (to "kill the lead" or graduate it to needing more follow-up or nurturing). Where there has not been follow-up, others may be notified or reminders may be set. If several advertisers were contacted with the lead, once one advertiser captures the lead, any others working on the lead would be notified. The lead could disappear from the sales flow once captured by another advertiser.

Thus, certain embodiments may provide for efficient methods of tracking and nurturing prospective and existing customers on behalf of a business to grow the business. Certain embodiments provide strong tools to track customers for advertisers that interface via phone calls. The system may provide visibility on how a lead is propagating through multiple advertiser queues. With leads being routed to multiple advertisers according to some embodiments, there is a need to have an ability to determine when a lead has been converted so that the lead can be taken out of the equation, i.e., so that lead can be taken out of the queue for other advertisers. Certain embodiments provide valuable aid to advertisers by identifying their leads, helping the advertisers know who their leads are, track the leads, and convert the leads.

In some embodiments, the management system 200-1 may be similar to the management system 200 previously disclosed but may be further configured to allow for lead propagation control. The management system 200 may include the call management system 206 and the lead management system 208. The call management system 206 may include a lead identification system 1038 configured to facilitate any one or combination of the lead identification features disclosed herein. The lead identification system 1038, for example, may include one or more session module controllers that may identify a caller and a callee (e.g., based on the ring-to number), and may initiate SIP processes so then a free switch may determine which number to route the call to. The management system 200 may include a lead routing system 1036 configured to facilitate any one or combination of the lead routing features disclosed herein. The management system 200 may include a lead outcome system 1042 configured to facilitate any one or combination of the post-routing lead handling features disclosed herein. The lead management system 208 may be configured to facilitate lead management features exposed to advertisers disclosed herein. For example, the lead management system 208 may route information between an advertiser mobile app and the backend system for tracking of lead nurturing. In various embodiments, the lead management system 208 may allow the system to be exposed through an advertiser mobile app, an online advertiser portal, and/or through alternate messaging means such as email.

Figure 11:
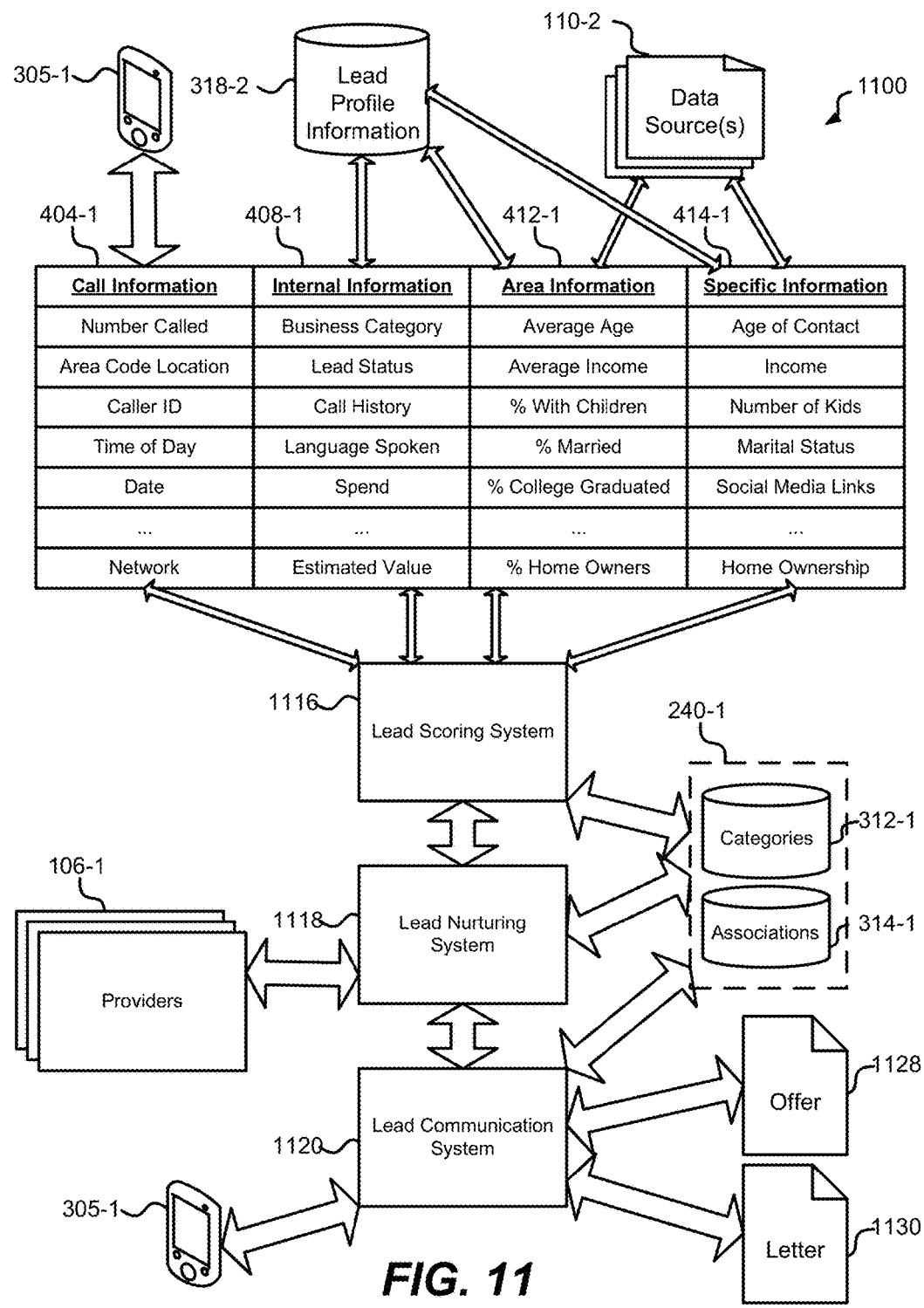
FIG. 11 illustrates certain aspects of lead propagation data flow, in accordance with certain embodiments of the present disclosure.

FIG. 11 illustrates certain aspects of lead propagation data flow 1100, in accordance with certain embodiments of the present disclosure. Responsive to an incoming lead, for example, from an end-user interface 305, the lead identification system 1038 may determine call information 404. The lead identification system 1038, which may be included the lead router system 1136 in some embodiments, may determine additional lead information as disclosed herein. The lead information may include call information 404, internal information 408, area information 412, specific information 414, and/or the like, and may be determined from one or more internal data repositories 240 and/or one or more data sources 110.

A lead scoring system 1116, which could include the classification engine 344 and/or matching engine 338 in some embodiments, may score the lead as disclosed herein. The scoring may be based at least in part on categories 312. In some embodiments, a lead nurturing system 1118 may generate a nurturing campaign based at least in part on the scoring and/or category information and may notify with providers 106 regarding the campaign and acquire input from the providers 106 regarding the campaign options. A lead communication system 1120 may manage the nurturing communication with the lead, which may be in the form of offers 1128 via email, calls, push notifications, etc. to the lead interface(s) 305, letters 1130, and/or the like. Additional aspects of lead propagation data flow are disclosed with respect to FIG. 12.

Figure 12:
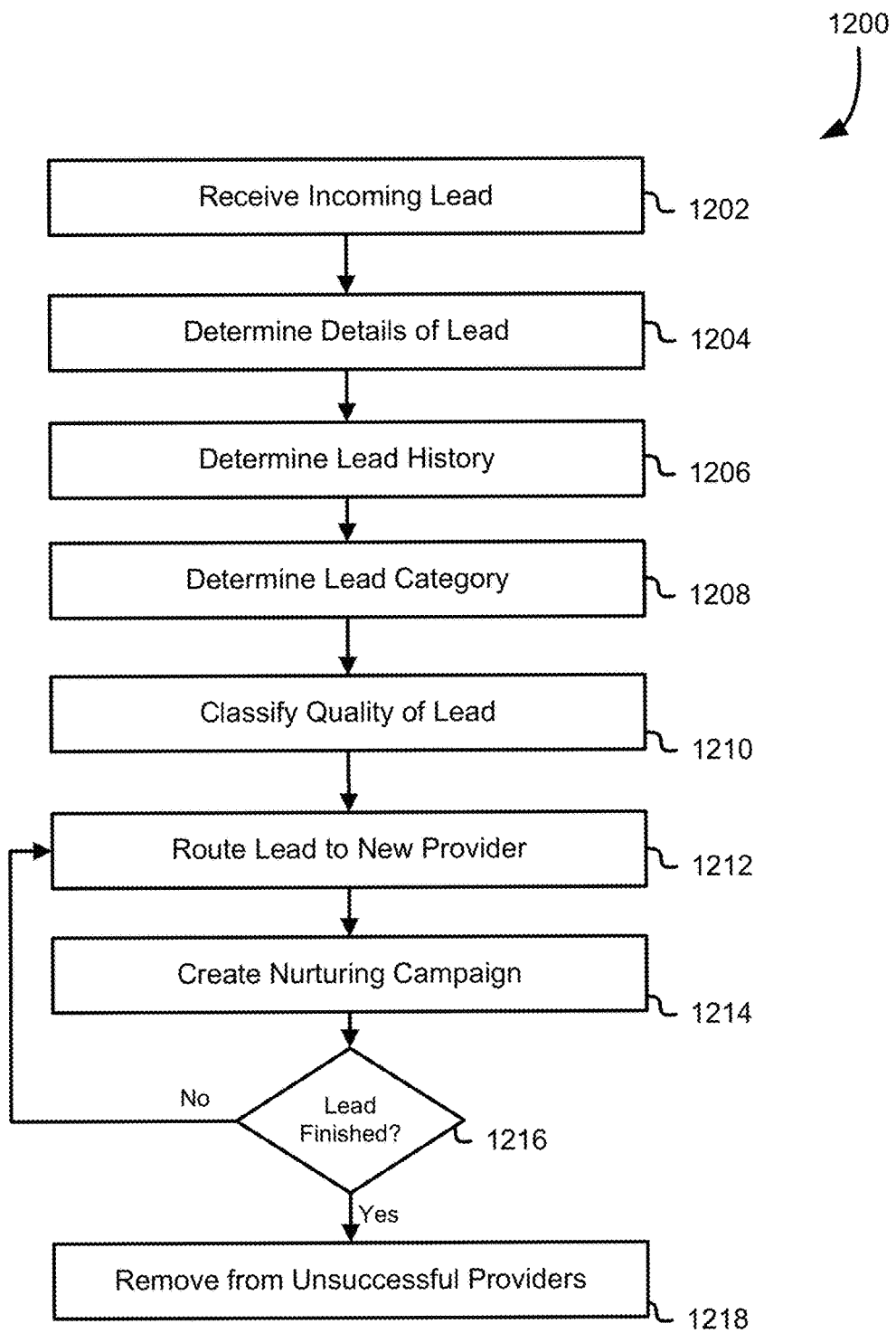
FIG. 12 illustrates a flowchart of a method of lead propagation control, in accordance with certain embodiments of the present disclosure.

FIG. 12 illustrates a flowchart of a method 1200 of lead propagation control, in accordance with certain embodiments of the present disclosure. Teachings of the present disclosure may be implemented in a variety of configurations that may correspond to the systems disclosed herein. As such, certain steps of the method 1200, and the other methods disclosed herein, may be omitted, and the order of the steps may be shuffled in any suitable manner and may depend on the implementation chosen. Moreover, while the following steps of the method 1200, and those of the other methods disclosed herein, may be separated for the sake of description, it should be understood that certain steps may be performed simultaneously or substantially simultaneously.

According to one embodiment, the method 1200 may begin as indicated by block 1202. As indicated by block 1202, an incoming lead may be received. A lead could come in the form of a phone call, email, etc. In the case of a phone call, the consumer may call the particular business that corresponds to an advertiser with a number provided by particular ad, which number may be a call tracking number, as disclosed herein.

As indicated by block 1204, details of the lead may be determined. As indicated by block 1206, a history of the lead may be determined. A caller profile may be generated. The caller profile may include caller ID, name, address, demographic information, and/or the like. The caller profile may indicate who the person is and, in some embodiments, who delivered the lead and how important it is. When a lead is delivered to an advertiser via email, web form, and/or the like, certain details of the consumer are captured, such as an email address and/or phone number, and a "caller" profile may be generated.

As indicated by block 1208, one or more lead categories for the lead may be determined. With the caller profile, other information may be determined, such as any one or combination of call information 404, internal information 408, area information 412, specific information 414, and/or the like. For example, based on the caller ID, the system may determine certain details of the prospective customer, such as name, address, household information, etc. The system may associate the caller with a pre-defined cluster (segment) who have typical characteristics, such as geography, household characteristics (e.g., home owner), family (e.g., two kids), annual income (e.g., between 100-150K), car ownership (e.g., two cars), four-bedroom house, etc. The system may also identify the caller's social handles for online social and/or business networks, which could be used to augment the data about the caller (e.g., with social graph information for the caller). Any other suitable lead information may be determined in various embodiments. Lead information may include any one or combination of details, categorizations, classifications, qualifications, and/or the like associated with a lead.

As indicated by block 1210, a quality of the lead may be classified. The system could use the lead information to qualify the lead according to any suitable scheme—e.g., high quality (important), medium, or low. As indicated by block 1212, the lead may be routed to a new provider. In some embodiments, lead information may be used by the system and/or an advertiser to prioritize the call appropriately with respect to other callers that may be calling in. In some embodiments, when the caller connects with an advertiser, the system may share lead information and use them to score the quality of the lead. In some embodiments, lead information could be shared post call. In some embodiments, the other information could be shared post call, such call metrics (e.g., call duration).

The system may also enable the advertiser to classify the type of lead—e.g., prospect, hot lead, no-go, send for nurturing or acquisition (customer sold). As indicated by block 1214, a nurturing campaign may be created. The system could use the lead information, including characteristics and personal information, to identify the type of nurturing campaign to be associated with the lead profile. Nurturing could include follow-up with the consumer. For example, the system may send out periodic reminders, offers, other communication based on the lead prospect type.

The system could allow for associating the lead with a particular workflow. The particular workflow could be chosen out of multiple workflows. Which particular workflow is associated with a particular lead could be based at least in part on the classification of the lead. By way of example without limitation, a workflow could include sending the consumer one email today (thanking them, for example), one email in a week, in a month, sending a deal or coupon, etc. as part of automated email marketing campaign. Another workflow could allow for more time to pass before contacting consumer, say no emails for a month, but send an email after a month, say with a newsletter sign-up. A hot prospect could get a coupon the next morning.

Workflows may be tied to categories. For example, low-frequency but high customer spend value, say the transaction size is greater than $100, may be a type of category that may be more appropriate for greater degrees of nurturing. As another, the system may determine whether the lead is a prospect or a sale. If a prospect, the system may determine options as to how to nurture the lead until the lead becomes a sale. If a sale, lead information about the lead may help the advertisers to understand the transaction.

In some embodiments, an email address of the lead could be obtained by the advertiser. Having obtained email address, the advertiser could enter it into the system. In some embodiments, the email address may be obtained by the system, e.g., based on the caller ID and/or certain other lead information.

As indicated by block 1216, it may be determined whether the lead is finished. In the case that the lead is determined to not be finished, flow may transition back to block 1212. However, the case that the lead is determined to be finished, flow may transition to block 1218. As part of the marketing automation process, the system may score how the consumer reacts to marketing actions. If the consumer opens the email, the score may be increased. As a consumer clicks through or take some other sort of action, such as downloading a white paper, the score may be increased. When the lead score satisfies a threshold, the advertiser may be notified. Various thresholds could be associated with various classifications of the lead and corresponding notifications to the advertiser that may, for example, correspond to whether the lead is interested, gathering information, ready to buy, etc. When a lead is ready to buy/make a decision, the lead may be considered nurtured.

As indicated by block 1218, the lead may be removed from one or more unsuccessful providers. Hence, when the lead is converted to an actual customer, the consumer having purchased, the lead may be removed from the queue of other advertisers. The other businesses may be informed of such.

Figure 13:
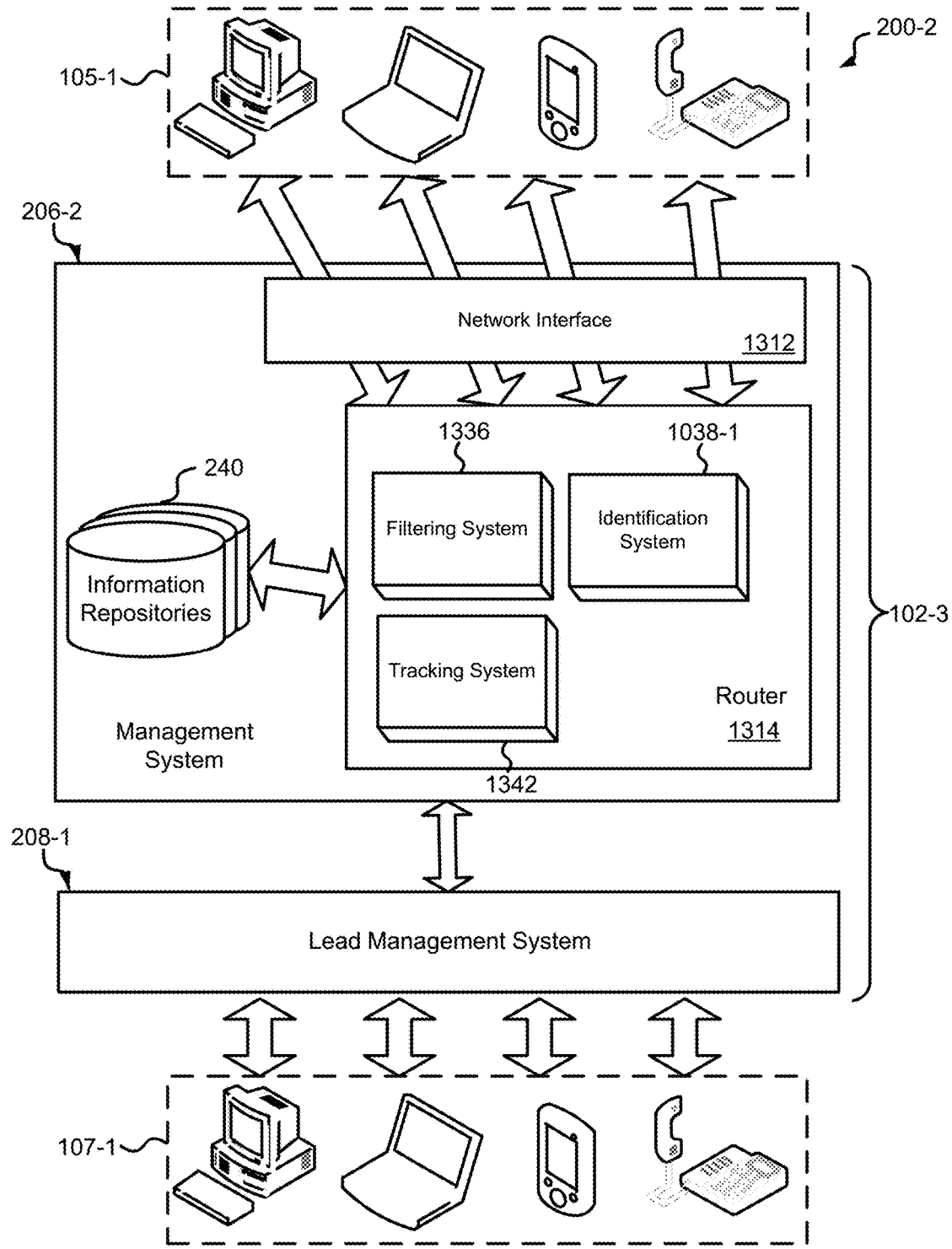
FIG. 13 depicts a block diagram of a call filtering system, in accordance with certain embodiments of the present disclosure.

FIG. 13 depicts a block diagram of a call filtering system 200-2, in accordance with certain embodiments of the present disclosure. Certain embodiments may filter out robo-calls and telemarketer calls (seeking to grow another business, not the advertiser's business) to an advertiser. By filtering out spammers, advertisers may not see the spam calls in reports and billing, the wasted time dealing with spammers may be minimized or eliminated, and more quality calls can be delivered to advertisers.

In some embodiments, the management system 200-2 may be similar to the management systems previously disclosed but may be further configured to allow for call filtering. The management system 206-2 may include the lead identification system 1038-1 configured to facilitate any one or combination of the lead identification features disclosed herein, including identifying leads to aid a filtering system 1336. The lead identification system 1038-1 could, for example, identify known callers and unknown callers. The lead identification system 1038-1 could pass any suitable caller identification information to the filtering system 1336 for filter processing. The filtering system 1336 may filter out robo-calls and telemarketer calls, and may be configured to facilitate any filtering features disclosed herein. A tracking system 1342 may be configured to facilitate any tracking features disclosed herein, such as keeping track of confirmed spammers, conditionally confirmed spammers, and confirmed leads.

Figure 14:
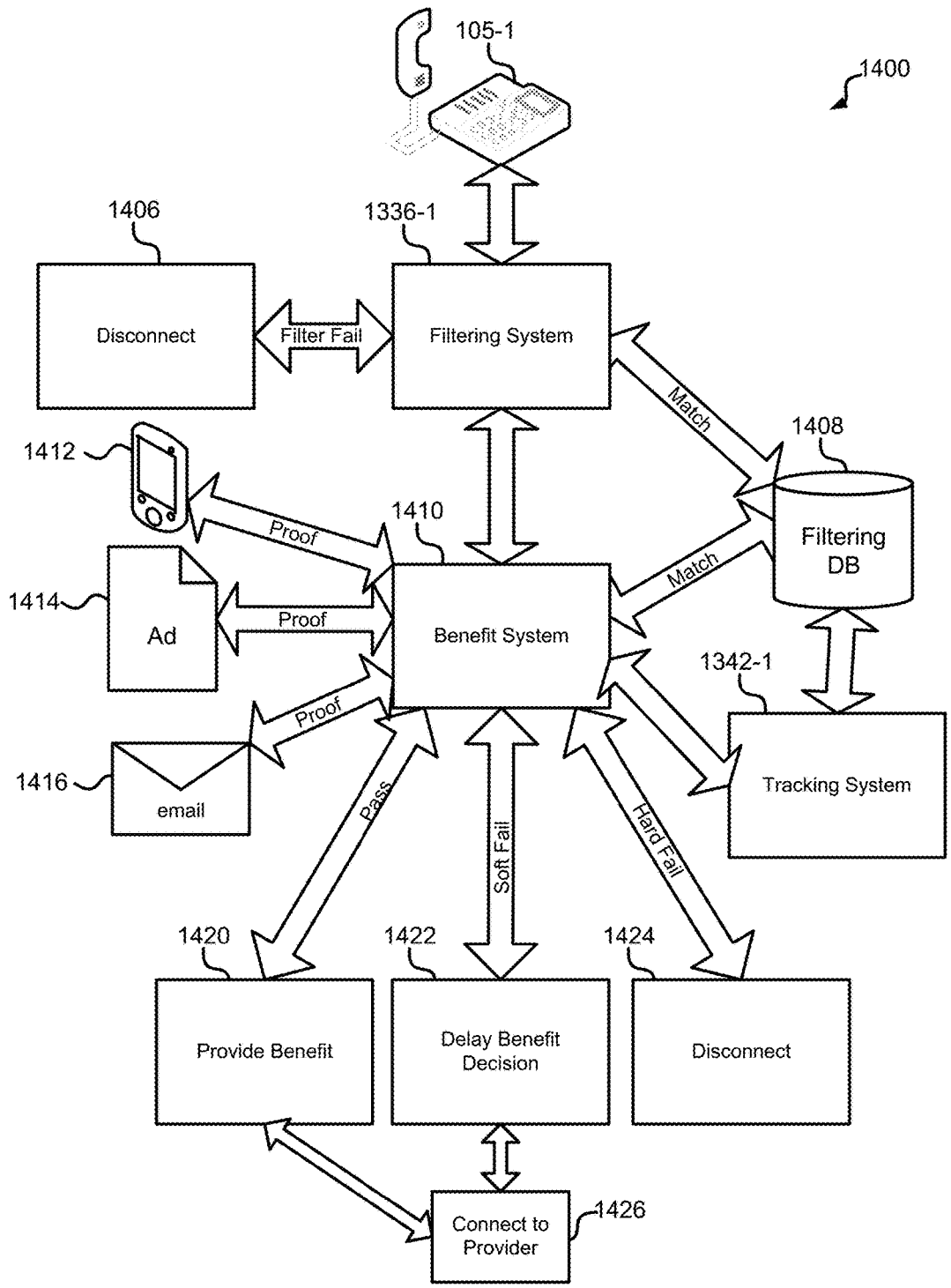
FIG. 14 illustrates certain aspects of call filtering data flow, in accordance with certain embodiments of the present disclosure.

FIG. 14 illustrates certain aspects of call filtering data flow 1400, in accordance with certain embodiments of the present disclosure. The information repositories 240 may include one or more filtering databases 1408 to store information on indicia of spam callers, such as originating numbers of spam callers. The tracking system 1342 may build the dataset of the filtering database 1408 based at least in part on who is actually calling one or more advertisers. The tracking system 1342 could monitor which numbers fail to overcome the filter processes to start filtering the spam calls automatically for multiple advertisers service by the platform. In some embodiments, the tracking system 1342 could monitor which numbers successfully overcome the filter processes to build the data set of the filtering database 1408 with information on confirmed leads/non-spammers.

In some embodiments, the filtering database 1408 may include known numbers and/or codes of confirmed leads. For example, online leads may be tracked with unique codes, communication references, extensions, etc. that are given to the phone system. End users 104 that use a client application of the platform (say, a mobile app) may be identified by phone number and/or other identification reference.

In some embodiments, the tracking system 1342 may build the filtering database 1408 with information about known spammers from data sources 110 (e.g., a published list of telemarketer numbers). Many spammers make calls that show up as coming from certain numbers, and oftentimes the numbers are not valid. In some embodiments, the tracking system 1342 may build the filtering database 1408 with information about invalid numbers as some spammers spoof numbers with invalid numbers (e.g., invalid area codes, incomplete numbers, unavailable numbers such as 911, etc.) to allow for number validation. Accordingly, certain embodiments may provide for filtering based on detection of invalid numbers as an indication of spoofing.

The filtering system 1336 of the switch 1314 may receive a call from an end-user interface 105 and may further receive call identification information from the lead identification system 1038. The filtering system 1336 may check the filtering database 1408 based on the call identification information. Upon finding a match in the filtering database 1408 indicating that the call is from a confirmed spammer, the filtering system 1336 may disconnect 1406 the call.

If the caller is unknown to the system or if a match is found in the filtering database 1408 indicating that the call is from a confirmed lead or is otherwise not a confirmed spammer, the call may be handled by a benefit system 1410. The benefit system 1410 may handle determinations of whether the system is providing a benefit 1420 to the advertiser of a call from a non-spammer, and thus the provider may be charged for call connected to the provider 1426. For a confirmed spammer, the benefit system 1410 may handle determinations that no benefit is provided to the provider with a disconnect 1424 of a confirmed spammer or a caller that otherwise fails to qualify as a non-spammer. Thus, the benefit system 1410 may determine that the provider may not be charged for such calls. The benefit system 1410 may handle determinations that a benefit decision should be delayed 1422 until after the call connected to the provider 1426 so that further information may be gathered as to the call. Thus, whether the provider may be charged for the call may be contingent upon further information and determinations as to the call.

In some embodiments, the filtering system 1336 may impose a response requirement 1412, 1414, 1416 on the caller. The response requirement may include, for example, a number-pressing response, a voice response, and/or the like in order to link the call with a secret code, pass phrase, etc. to confirm that the caller can input responsive to prompt, and is thus not a robocall. In various embodiments, the code, phrase, ad detail, etc. for the response could be conveyed to caller via communication device 1412, mobile app on the communication device 1412, an advertisement 1414 (which could be a paper advertisement or an electronic advertisement), email 1416, push notification, and/or any other suitable means.

If the caller successfully satisfies the response requirement, the call may be connected 1426 to the provider in some embodiments, or further filtering may be employed in some embodiments. In some embodiments, a response requirement may be utilized when no match is found in the filtering database 1408. If the caller fails to satisfy the response requirement, the call may be disconnected or further proof may be required. In various embodiments, the failure to satisfy the response requirement, a threshold number of failures to response requirements, and/or a combination of response requirement and other filtering failures may result in the caller being flagged in the filtering database 1408 as a spammer that should be disconnected or suspect spammer that requires additional filtering.

In some embodiments, pattern detection may be employed. The pattern detection may involve monitoring calls from a specific number for frequency. A frequency threshold may be employed to identify likely spammers that would make too many calls within a certain time period to advertisers as compared to a valid lead. A caller that exceeds the frequency threshold may be blocked. In some embodiments, the pattern detection may be based on category to identify whether calls are being made repeatedly to advertisers in a particular category within a given time frame to identify suspect telemarketers. A caller that exceeds the frequency threshold corresponding to a given category may be blocked.

Figure 15:
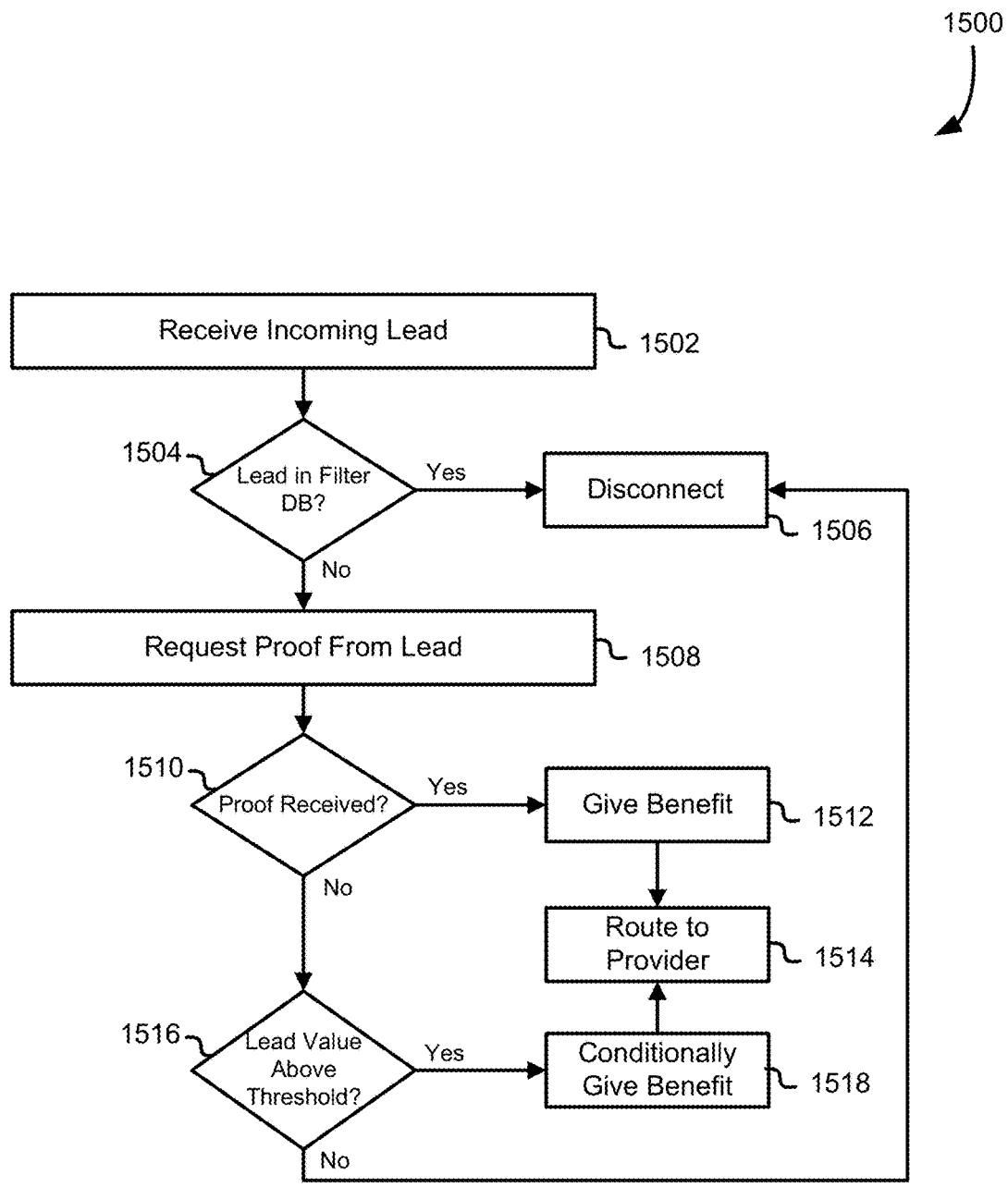
FIG. 15 illustrates a flowchart of a method of lead propagation control, in accordance with certain embodiments of the present disclosure.

FIG. 15 illustrates a flowchart of a method 1500 of lead propagation control, in accordance with certain embodiments of the present disclosure. Teachings of the present disclosure may be implemented in a variety of configurations that may correspond to the systems disclosed herein. As such, certain steps of the method 1500, and the other methods disclosed herein, may be omitted, and the order of the steps may be shuffled in any suitable manner and may depend on the implementation chosen. Moreover, while the following steps of the method 1500, and those of the other methods disclosed herein, may be separated for the sake of description, it should be understood that certain steps may be performed simultaneously or substantially simultaneously.

According to one embodiment, the method 1500 may begin as indicated by block 1502. As indicated by block 1502, an incoming lead may be received. As indicated by block 1504, it may be determined whether the lead is identified in the filter database. If the lead is identified in the filter database, flow may transition to block 1506. As indicated by block 1506, the call may be disconnected. However, if the lead is not identified in the filter database, flow may transition to block 1508.

As indicated by block 1508, proof may be requested from the lead. As indicated by block 1510, it may be determined whether proof is received. In the case that proof is received, flow may transition to block 1512. As indicated by block 1512, a benefit may be given, and the call may be routed to the provider, as indicated by block 1514.

However, in the case that proof is not received, it may be determined whether a lead value attributed to the lead (e.g., a lead score determined for the lead as disclosed in various embodiments herein) satisfies a lead value threshold, as indicated by block 1516. If the lead value threshold is satisfied, a benefit may be conditionally given, as indicated by block 1518, and the call may be routed to the provider, as indicated by block 1514. The connected call may be further analyzed based on call characteristics, call content analysis, and/or provider feedback as disclosed herein to confirm whether the call is from a spammer. However, with the lead value threshold not satisfied, flow may transition to block 1506, and the call may be disconnected.

Figure 16:
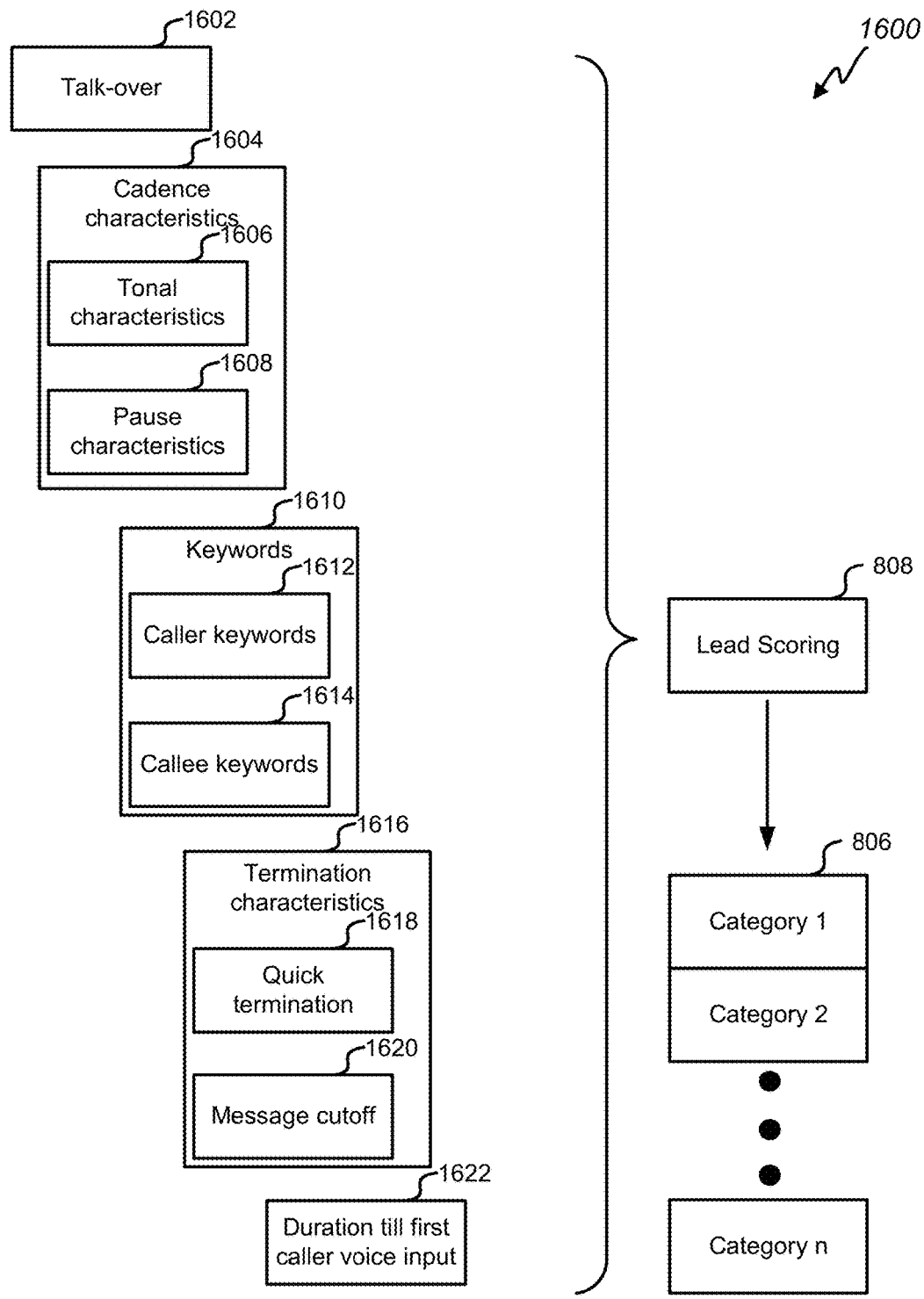
FIG. 16 depicts a functional block diagram of certain aspects of call filtering, in accordance with certain embodiments of the present disclosure.

FIG. 16 depicts a functional block diagram of certain aspects of call filtering 1600, in accordance with certain embodiments of the present disclosure. In some embodiments, the call filtering 1600 may be facilitated with a client application installed on the communication device of the service provider. As disclosed herein and in the incorporated application, leads may be scored and/or otherwise qualified based at least in part on a number of criteria that may indicate a non-lead or a bad lead. Further, calls may be recorded and analyzed to qualify leads as non-leads, bad leads, good leads, etc. Such embodiments may be used to filter calls so that non-leads, such as spammers, may be flagged and blocked. The lead qualification 900 of FIG. 9, for example, may be employed to qualify leads, with the result being used to subsequently filter calls.

The call filtering 1600 provides an example of some embodiments that provide for robocall detection after a call has been connected to a provider. The detection may be performed by the system and, in some embodiment, may be supplemented with provider feedback gathered via feedback options presented to providers. One or more clues that a given call may well be a robocall may be detected via the call analytics. Instances of a caller message talking over 1602 the callee may be a clue indicative of a robocall. For example, a caller with a message that talks over the callee's initial greeting may be a clue indicative of a robocall.

In some embodiments, any one or combination of caller message characteristics may be analyzed for clues indicative of a robocall. A caller with one or more certain message cadence characteristics 1604 may be indicative of a robocall. For example, tonal characteristics 1606 such as a monotone quality to the message could be taken as a clue that the call may well be a robocall.

As another example, pause characteristics 1608 such as a lack of pauses in the message cadence such that the caller continually speaks without pause for a certain amount of time greater than is typical for normal conversation could be taken as a clue that the call is a robocall. One or more pause thresholds could be used to make such determinations. As one possible example, a lack of a pause for at least one second within the first fifteen seconds of a call or before the callee hangs up may be taken as a clue that the call may well be a robocall.

Content of a call could be could be analyzed for keywords 1610 that are clues indicative of a robocall. Key terms typical for robocalls could be detected in the caller's message 1612. By way of example, terms such as "stay on the line," "press one," "poll," "survey," and/or the like may be detected and taken as clues that calls may well be robocalls. Other terms more specific to certain contexts, say political calls during election seasons, could be detected as clues. Additionally, certain words of the callee 1614 could be indicative of a robocall. For example, expletives, expressions of frustration, and/or the like uttered by the callee prior to hanging up may be clues further corroborating the evidence that the call likely is a robocall.

Another indication that a call may be a robocall could be the termination characteristics 1616 of the call. For example, there may be a quick termination 1618 as the callee may terminate call within a short time after picking up. Thus, call duration and/or callee termination may indicate robocalls. Further, there may be a message cutoff 1620 as the callee may terminate the call while the caller message continues, effectively cutting off the caller message midstream. The detection of the cutoff could be taken as another clue.

Another indication that a call may be a robocall could be the duration till a first voice input is provided by the caller 1622. Oftentimes with a robocall, a pause occurs after the callee picks up and before the automated message begins, the pause being longer than is typical for a human call. Any suitable threshold of time may be used to detect an abnormal pause before the first voice input of the caller begins. For example, a callee may answer the phone with a voice greeting, say a simple "hello." If the time from when the callee answers with a greeting until the voice input from the caller is detected meets or exceeds a threshold of say two or three seconds, such an instance maybe taken as a clue that the call may be a robocall. Further, repeat greetings on from the callee, such as a subsequent "hello?" after the callee's initial greeting could be taken as further corroborating evidence that the calls may well be a robocall.

Figure 17:
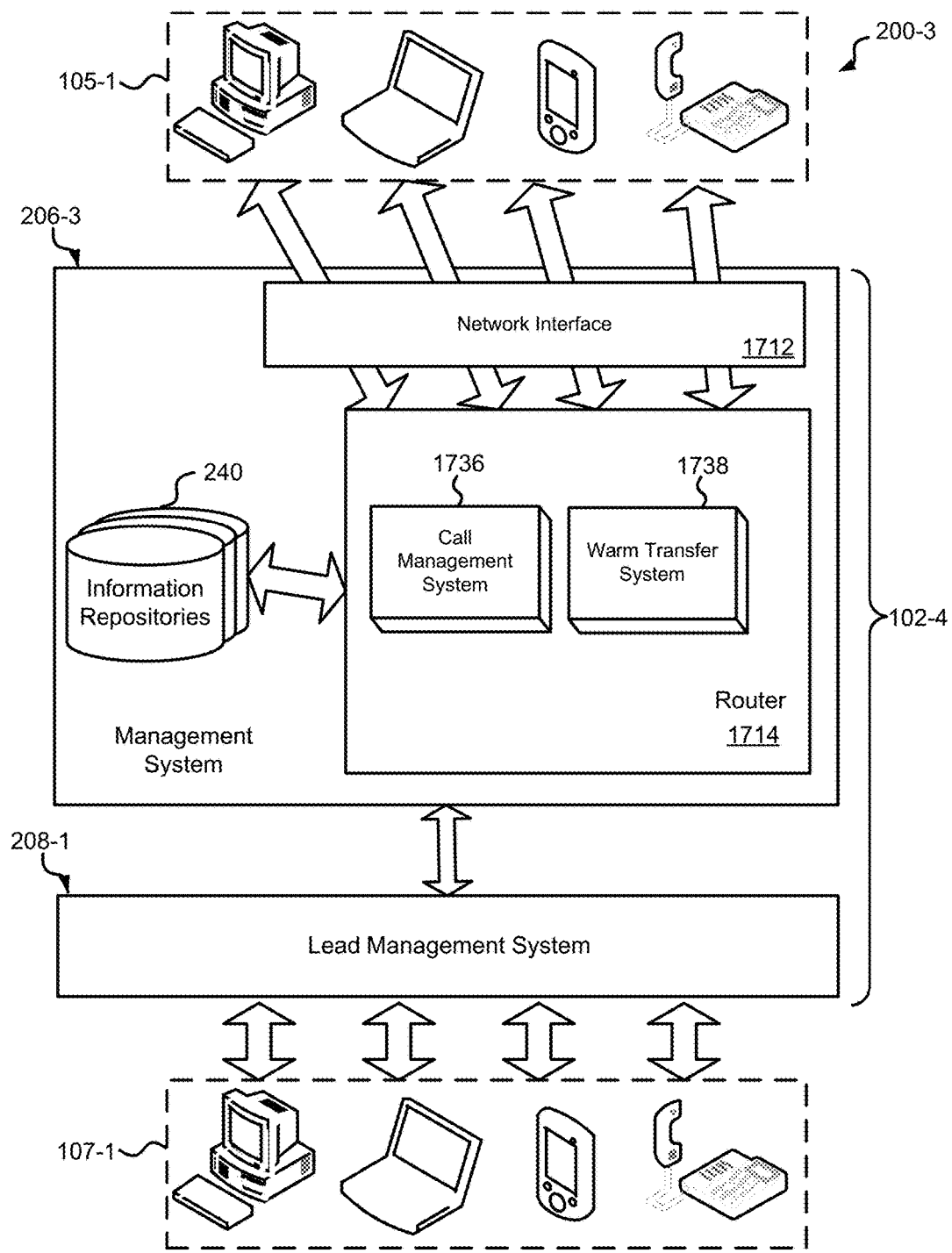
FIG. 17 depicts a block diagram of an intelligent recommendation and transfer management system, in accordance with certain embodiments of the present disclosure.

FIG. 17 depicts a block diagram of an intelligent recommendation and transfer management system 200-3, in accordance with certain embodiments of the present disclosure. The system 200-3 may provide for call handling in situations where a provider is unavailable (e.g., a closed business situation). In some embodiments, the system 200-3 may be similar to the management systems previously disclosed but may be further configured to allow for intelligently presenting alternative options callers and transferring calls based on caller selection.

The management system 206-3 may include a call management system 1736 may include one or more switches and/or servers, and may be configured to facilitate any one or combination of the call management features disclosed herein, including handling incoming calls and determining availability of providers. In some embodiments, when a consumer makes a call corresponding to a particular number, the call management system 1736 may make a separate outbound call to a provider, and, when that call is picked up, the call management system 1736 may connect the two calls. In some embodiments, the call management system 1736 may make multiple separate outbound calls to multiple providers, simultaneously or substantially simultaneously, and may connect the first provider that picks up a call. In some embodiments, the call management system 1736 may forward the single call from the consumer to a single advertiser.

The management system 206-3 may include a warm transfer system 1738 configured to facilitate any one or combination of the transfer features disclosed herein. Based on an indication of unavailability of one or more providers, the warm transfer system 1738 may identify one or more transfer options, facilitate provision of the options to the caller, process indicia of caller response, and transfer the caller to an alternative provider.

Figure 18:
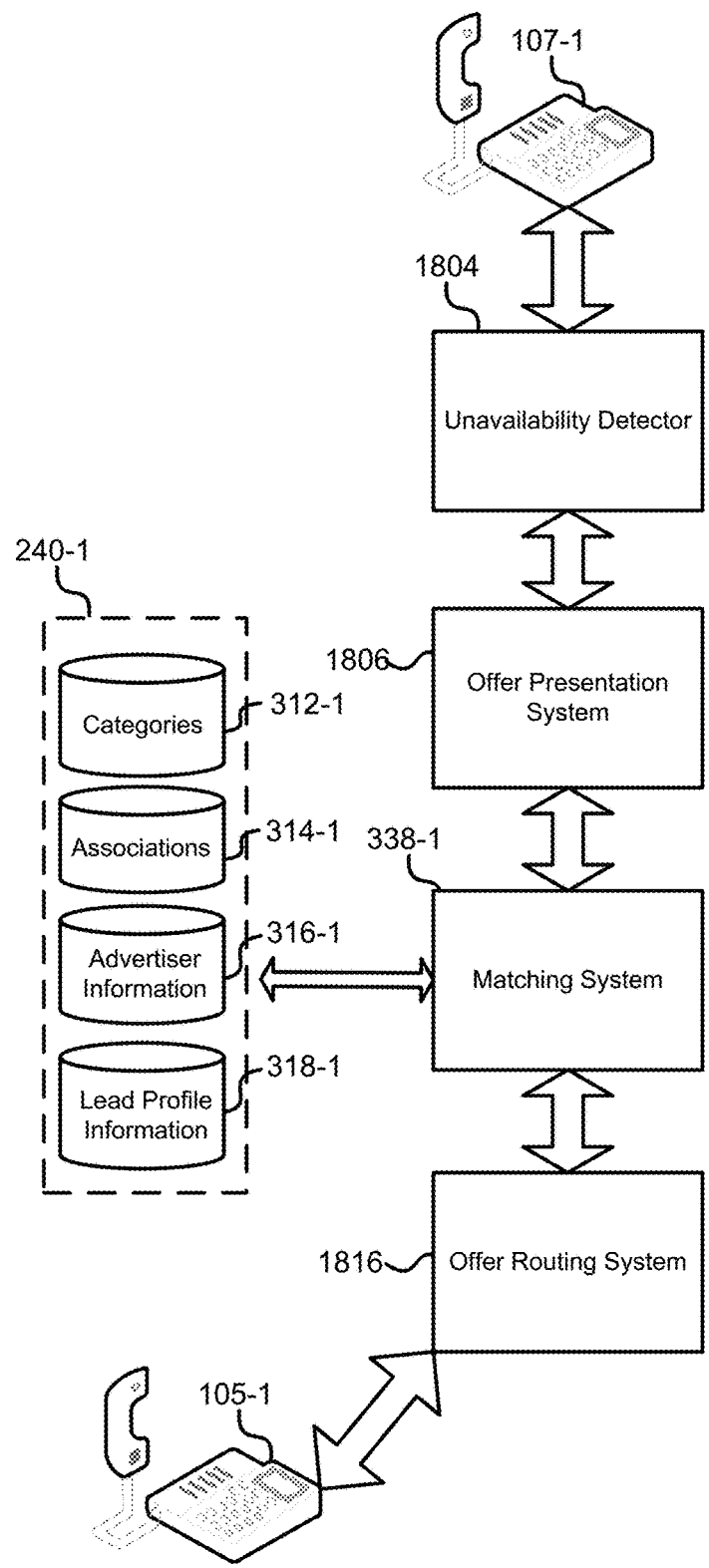
FIG. 18 illustrates certain aspects of intelligent recommendation and transfer data flow, in accordance with certain embodiments of the present disclosure.

FIG. 18 illustrates certain aspects of intelligent recommendation and transfer data flow 1800, in accordance with certain embodiments of the present disclosure. An unavailability detector 1804 may determine an unavailability state of a first set of one or more advertisers via interface(s) 107. In some embodiments, the number corresponding to the incoming call may be a call tracking number maintained by the system, and the system may have pre-determined that the first set of one or more advertisers is no longer available (e.g., a business is closed during off hours or permanently closed). In some embodiments, the number may not be a call tracking number, and may be determined to be no longer in service. In some embodiments, the unavailability states may be determined after a call to the business is not answered within a certain time period, say 10 seconds.

Consequent to a determination of unavailability, an offer presentations system 1806 may present one or more user-selectable options to the caller. Voice prompts can be used to solve immediate needs or may be opportunistic. For example, "Joe's Computer Repair is currently closed, you can leave a message or be connected to a technical support expert from an outside vendor." Responsive to the caller leaving a voicemail, the system could forward the message to the advertiser. In some cases, the message may be forwarded to an alternative phone number of the advertiser (e.g., a cell phone number, a home number, an alternative business site/provider, etc.). Such alternatives may be pre-defined in the advertiser's advertiser profile, which the system could check for forwarding the voicemail. In some cases, the message may be forwarded to the advertiser via the advertiser platform. In some embodiments, in addition or in alternative, the voicemail message may be transcribed and the message may be sent to the advertiser via the advertiser platform, text message, push notification, email, and/or the like. In some embodiments, the forwarding of the voicemail recording and/or transcription to notify the advertiser via one or more alternative channels may be chargeable as providing a lead to the advertiser, whereas the initial call to the advertiser may or may not be chargeable.

In various embodiments, the transfer option could be blind, or options for specific alternatives could be presented. Thus, for example, a prompt could be "Pizza Table is closed, press one to connect to the nearby Round Pizza, press two to connect to the nearby Papa's Pizza." Accordingly, user options to be connected with alternatives providers in the same and/or similar categories may be presented.

Responsive to user selection of an option, an offer routing system 1816 (which may correspond to the lead routing system in some embodiments) may route the call to the selected alternative. In some embodiments, the routing to the alternative may be chargeable as providing a lead to the alternate business, whereas the initial call to the first business may or may not be chargeable.

To identify alternatives, certain embodiments may identify matches based at least partially on similarities of characteristics of a caller and/or characteristics of providers, including location characteristics, as disclosed herein. Any suitable algorithm for assessing similarity may be employed. In some embodiments, the caller may be matched with alternative providers in the same category as the unavailable provider. In some embodiments, alternative providers may be identified based on a match with the unavailable provider. Certain embodiments may identify alternatives according to both lead qualification of callers and correlation to advertisers able to provide service to caller.

Figure 19:
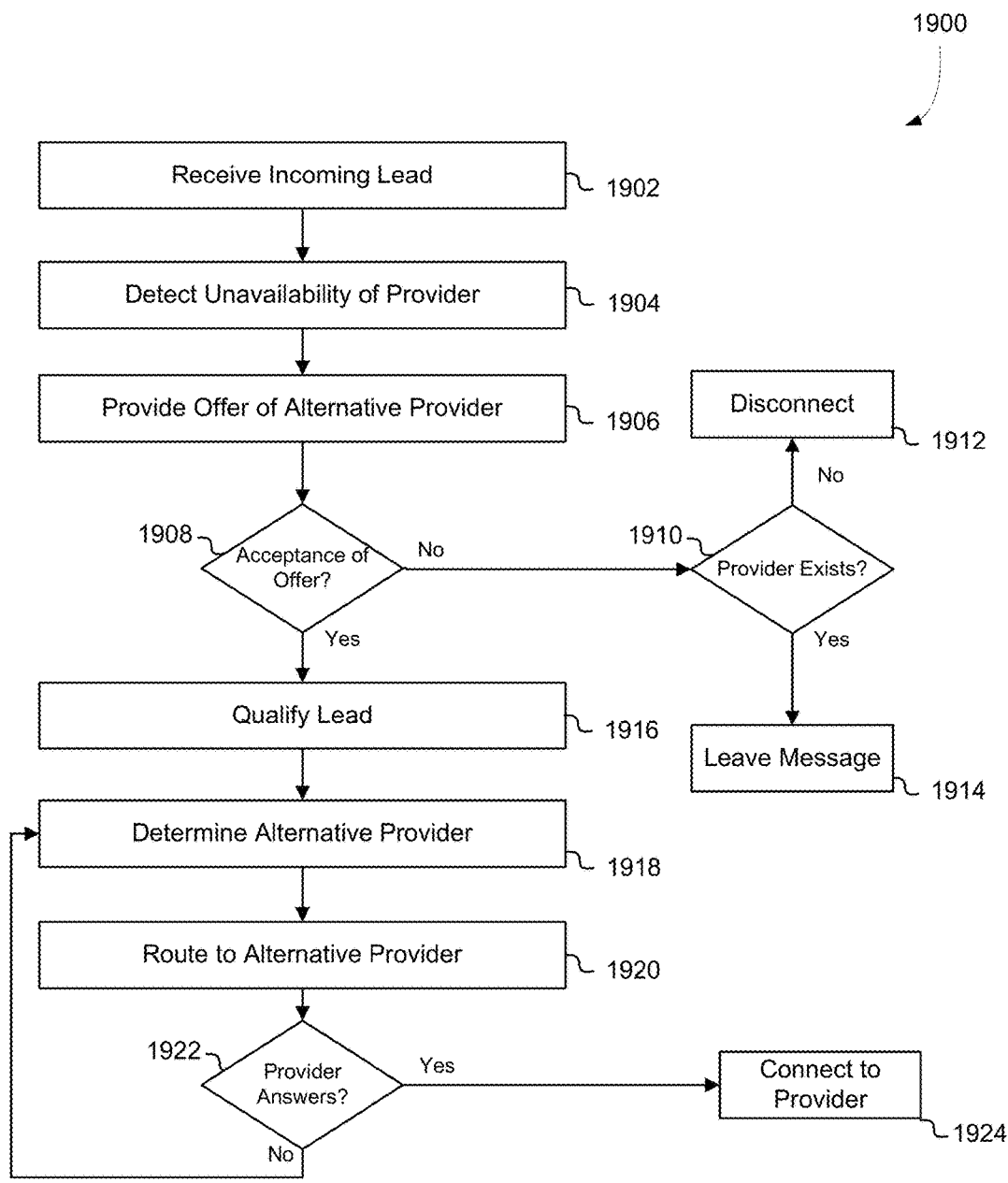
FIG. 19 illustrates a flowchart of a method of intelligent recommendation and transfer, in accordance with certain embodiments of the present disclosure.

FIG. 19 illustrates a flowchart of a method 1900 of intelligent recommendation and transfer, in accordance with certain embodiments of the present disclosure. Teachings of the present disclosure may be implemented in a variety of configurations that may correspond to the systems disclosed herein. As such, certain steps of the method 1900, and the other methods disclosed herein, may be omitted, and the order of the steps may be shuffled in any suitable manner and may depend on the implementation chosen. Moreover, while the following steps of the method 1900, and those of the other methods disclosed herein, may be separated for the sake of description, it should be understood that certain steps may be performed simultaneously or substantially simultaneously.

According to one embodiment, the method 1900 may begin as indicated by block 1902. As indicated by block 1902, an incoming lead may be received. A provider may be identified for the lead in any suitable manner, such as in accordance with various embodiments disclosed herein. As indicated by block 1904, unavailability of the provider may be detected. As indicated by block 1906, one or more user-selectable options may be provided to the lead to offer one or more alternative providers.

As indicated by block 1908, it may be determined whether the offer is accepted based on user selection. If the offer is not accepted, flow may transition to block 1910. As indicated by block 1910, there may be determined whether the provider exists (e.g., whether the business is permanently closed, such as in the case of a business not having subscribed to the advertising platform). In the case that the provider is determined to not exist, the call may be disconnected, as indicated by block 1912. However, in the case that the provider is determined to exist, a voicemail message may be left for the provider, as indicated by block 1914. The system could record and/or transcribe voicemail message and forward the message to the advertiser via the advertiser platform, for example.

In the case that the offer is accepted, the lead may be qualified, as indicated by block 1916, in accordance with any one or combination of lead qualification features disclosed herein. As indicated by block 1918, in alternative provider may be determined based at least in part on the lead qualification. As indicated by block 1920, the call may be routed to the alternative provider. As indicated by block 1922, it may be determined whether the alternative provider answers. If the alternative provider answers, the call may be connected to the alternative provider, as indicated by block 1924. If the alternative provider is determined to be unavailable, the process flow may loop back to block 1918, and one or more additional alternative may be determined.

Some embodiments, it may be determined whether caller's needs have been met. In some cases, the determination of whether the caller's needs have been met may include voice prompts before, during, and/or after the connection to the alternative provider, inquiring as to whether the caller has been satisfied and providing user selectable options for the caller to respond. Thus, if the caller indicates that the caller's needs not been met, the flow may loop back to block 1918.

Figure 20:
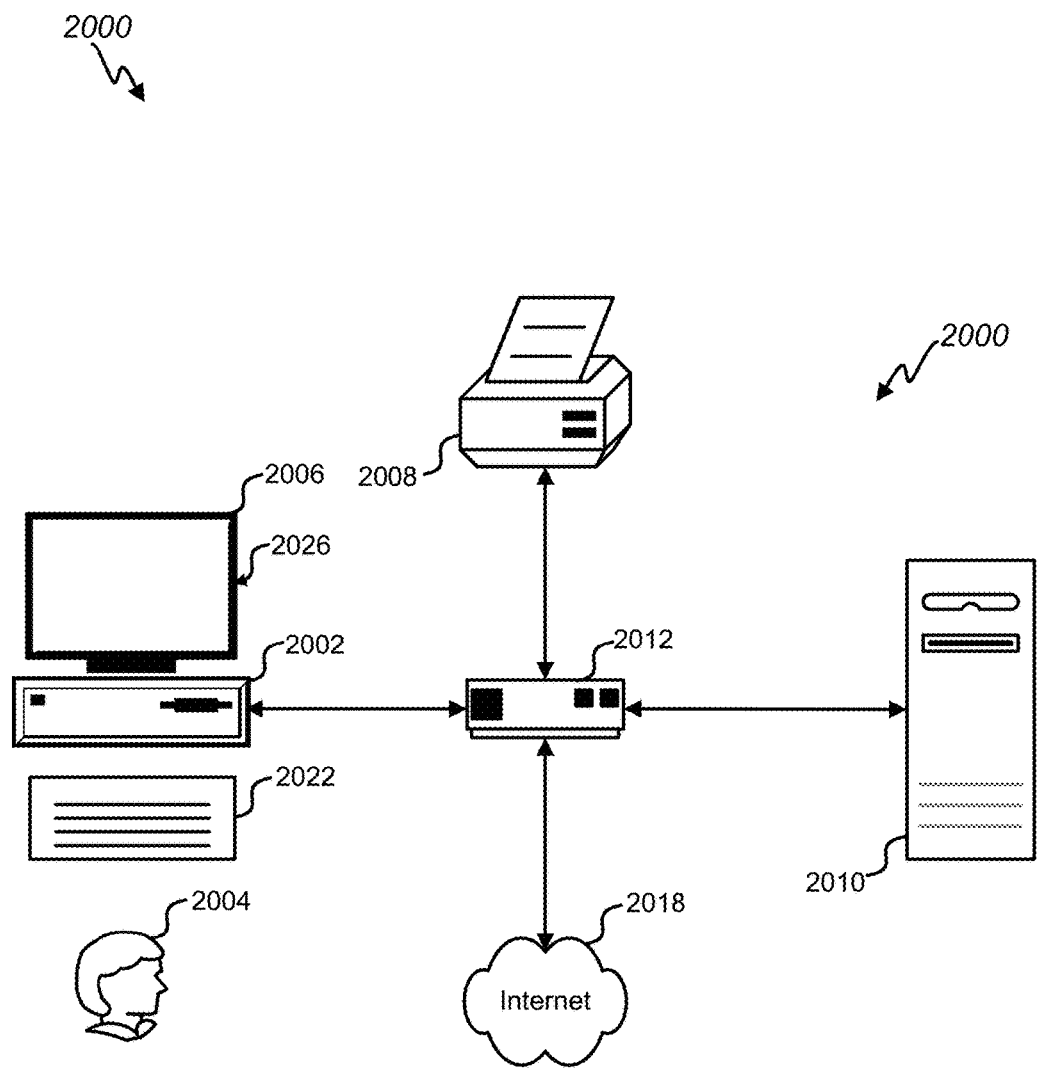
FIG. 20 depicts a block diagram of an embodiment of a computer system, in accordance with certain embodiments of the present disclosure.

Referring next to FIG. 20, an exemplary environment with which embodiments may be implemented is shown with a computer system 2000 that can be used by a designer 2004 to design, for example without limitation, electronic designs. The computer system 2000 can include a computer 2002, keyboard 2022, a network router 2012, a printer 2008, and a monitor 2006. The monitor 2006, processor 2002 and keyboard 2022 are part of a computer system 2026, which can be a laptop computer, desktop computer, handheld computer, mainframe computer, etc. The monitor 2006 can be a CRT, flat screen, etc.

A designer 2004 can input commands into the computer 2002 using various input devices, such as a mouse, keyboard 2022, track ball, touch screen, etc. If the computer system 2000 comprises a mainframe, a designer 2004 can access the computer 2002 using, for example without limitation, a terminal or terminal interface. Additionally, the computer system 2026 may be connected to a printer 2008 and a server 2010 using a network router 2012, which may connect to the Internet 2018 or a WAN.

The server 2010 may, for example without limitation, be used to store additional software programs and data. In some embodiments, software implementing the systems and methods described herein can be stored on a storage medium in the server 2010. Thus, the software can be run from the storage medium in the server 2010. In another embodiment, software implementing the systems and methods described herein can be stored on a storage medium in the computer 2002. Thus, the software can be run from the storage medium in the computer system 2026. Therefore, in this embodiment, the software can be used whether or not computer 2002 is connected to network router 2012. Printer 2008 may be connected directly to computer 2002, in which case, the computer system 2026 can print whether or not it is connected to network router 2012.

Figure 21:
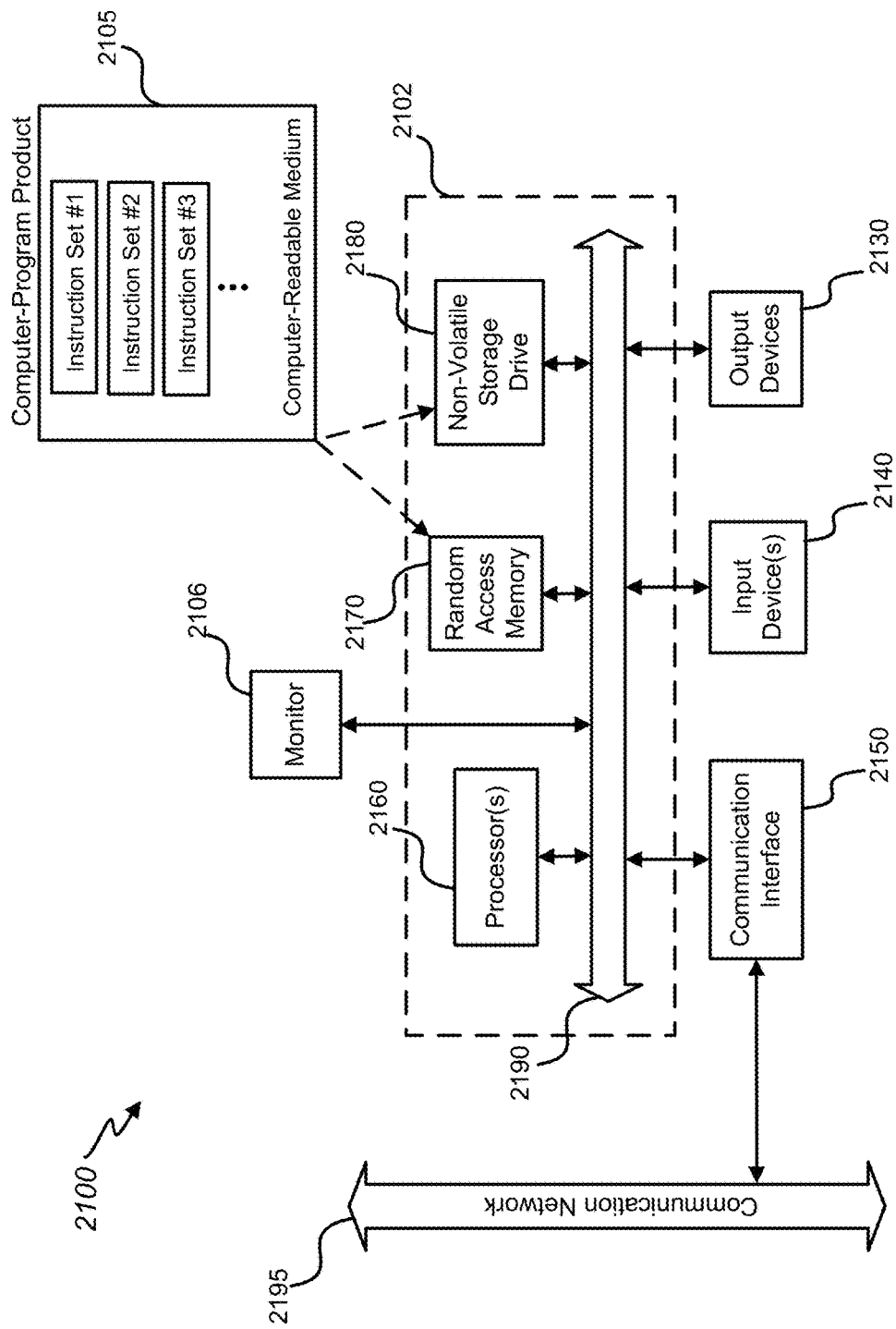
FIG. 21 depicts a block diagram of an embodiment of a special-purpose computer system, in accordance with certain embodiments of the present disclosure.

With reference to FIG. 21, an embodiment of a special-purpose computer system 2100 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 426, it is transformed into the special-purpose computer system 2100.

Special-purpose computer system 2100 comprises a computer 2102, a monitor 2102 coupled to computer 2102, one or more additional user output devices 2130 (optional) coupled to computer 2102, one or more user input devices 2140 (e.g., keyboard, mouse, track ball, touch screen) coupled to computer 2102, an optional communications interface 2150 coupled to computer 2102, a computer-program product 2105 stored in a tangible computer-readable memory in computer 2102. Computer-program product 2105 directs system 2100 to perform the above-described methods. Computer 2102 may include one or more processors 2160 that communicate with a number of peripheral devices via a bus subsystem 2190. These peripheral devices may include user output device(s) 2130, user input device(s) 2140, communications interface 2150, and a storage subsystem, such as random access memory (RAM) 2170 and non-volatile storage drive 2180 (e.g., disk drive, optical drive, solid state drive), which are forms of tangible computer-readable memory.

Computer-program product 2105 may be stored in non-volatile storage drive 2180 or another computer-readable medium accessible to computer 2102 and loaded into memory 2170. Each processor 2160 may comprise a microprocessor, such as a microprocessor from Intel® or Advanced Micro Devices, Inc.®, or the like. To support computer-program product 2105, the computer 2102 runs an operating system that handles the communications of product 2105 with the above-noted components, as well as the communications between the above-noted components in support of the computer-program product 2105. Exemplary operating systems include Windows® or the like from Microsoft® Corporation, Solaris® from Oracle®, LINUX, UNIX, and the like.

User input devices 2140 include all possible types of devices and mechanisms to input information to computer system 2102. These may include a keyboard, a keypad, a mouse, a scanner, a digital drawing pad, a touch screen incorporated into the display, audio input devices such as voice recognition systems, microphones, and other types of input devices. In various embodiments, user input devices 2140 are typically embodied as a computer mouse, a trackball, a track pad, a joystick, wireless remote, a drawing tablet, a voice command system. User input devices 2140 typically allow a user to select objects, icons, text and the like that appear on the monitor 2102 via a command such as a click of a button or the like. User output devices 2130 include all possible types of devices and mechanisms to output information from computer 2102. These may include a display (e.g., monitor 2102), printers, non-visual displays such as audio output devices, etc.

Communications interface 2150 provides an interface to other communication networks 2195 and devices and may serve as an interface to receive data from and transmit data to other systems, WANs and/or the Internet 2118. Embodiments of communications interface 2150 typically include an Ethernet card, a modem (telephone, satellite, cable, ISDN), a (asynchronous) digital subscriber line (DSL) unit, a FireWire® interface, a USB® interface, a wireless network adapter, and the like. For example without limitation, communications interface 2150 may be coupled to a computer network, to a FireWire® bus, or the like. In other embodiments, communications interface 2150 may be physically integrated on the motherboard of computer 2102, and/or may be a software program, or the like.

RAM 2170 and non-volatile storage drive 2180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2170 and non-volatile storage drive 2180 may be configured to store the basic programming and data constructs that provide the functionality of various embodiments of the present invention, as described above.

Software instruction sets that provide the functionality of the present invention may be stored in RAM 2170 and non-volatile storage drive 2180. These instruction sets or code may be executed by the processor(s) 2160. RAM 2170 and non-volatile storage drive 2180 may also provide a repository to store data and data structures used in accordance with the present invention. RAM 2170 and non-volatile storage drive 2180 may include a number of memories including a main random access memory (RAM) to store of instructions and data during program execution and a read-only memory (ROM) in which fixed instructions are stored. RAM 2170 and non-volatile storage drive 2180 may include a file storage subsystem providing persistent (non-volatile) storage of program and/or data files. RAM 2170 and non-volatile storage drive 2180 may also include removable storage systems, such as removable flash memory.

Bus subsystem 2190 provides a mechanism to allow the various components and subsystems of computer 2102 communicate with each other as intended. Although bus subsystem 2190 is shown schematically as a single bus, alternative embodiments of the bus subsystem may utilize multiple busses or communication paths within the computer 2102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for centrally managing inbound calls, the system comprising:
    a network interface that facilitates communication with a set of callers and a set of receivers;
    a datastore storing information relating to a set of categories and the set of receivers;
    a telephony switch in communication with the datastore and the network interface, the telephony switch configured to:
        receive an inbound call from a caller;
        process a first set of information about the inbound call, the first set of information identifying characteristics corresponding to the inbound call based in part on analyzing one or more detected spoken words of the caller captured during the inbound call;
        determine a second set of information about the inbound call based at least in part on the first set of information, the second set of information identifying characteristics corresponding to the caller;
        match a first category of the set of categories to the inbound call based at least in part on the first set of information identifying the characteristics based in part on the analyzing of the detected spoken words of the caller captured during the inbound call, and the second set of information;
        determine a first receiver of the inbound call based at least in part on the first category, the first receiver selected from a first set of receivers associated with the first category; and
        determine a numerical lead quality score of the inbound call based at least in part on call characteristics in which a subset of the call characteristics are detected during the first inbound call.

2. The system of claim 1, wherein:
the categories are categories from a telephone directory.

3. The system of claim 1, wherein:
the characteristics corresponding to the inbound call comprise an incoming telephone number and a telephone number called.

4. The system of claim 1, wherein:
the characteristics corresponding to the caller comprise demographic information.

5. The system of claim 4, wherein:
the demographic information indicates one or more of a language spoken, an estimated income, an estimated age group and/or an estimated family size.

6. The system of claim 1, further comprising:
a quality management system configured to measure success of a set of receivers.

7. The system of claim 6, wherein the quality management system comprises:
a call timer configured to measure call duration.

8. The system of claim 1, wherein prior to determine the numerical lead quality score, the telephony switch is further configured to:
route, via the inbound call, the caller to the first receiver in response to determining the first receiver of the inbound call.

9. The system of claim 1, wherein:
the numerical lead quality score denotes an estimate of the caller to do business with the receiver.

10. The system of claim 1, wherein the telephony switch is further configured to:
determine the numerical lead quality score by detecting at least one keyword of the detected spoken words during the inbound call.

11. A method for managing inbound calls in which a network interface, in communication with a telephony switch, facilitates communication with callers and a set of receivers and in which a datastore, in communication with the telephony switch, stores information relating to a set of categories and the set of receivers, the method comprising:

receiving, via the telephony switch, an inbound call from a caller;

processing a first set of information about the inbound call, the first set of information identifying one or more characteristics of the inbound call based in part on analyzing one or more detected spoken words of the caller captured during the inbound call;

determining a second set of information about the inbound call based at least in part on the first set of information, the second set of information identifying one or more characteristics of the caller;

matching a first category to the inbound call based at least in part on the first set of information identifying the characteristics based in part on the analyzing of the detected spoken words of the caller captured during the inbound call, and the second set of information;

determining a first receiver of the inbound call based at least in part on the first category, the first receiver selected from a first set of receivers associated with the first category; and determining a lead quality score of the inbound call based at least in part on call characteristics in which a subset of the call characteristics are detected during the inbound call.

12. The method of claim 11, wherein:
the numerical lead quality score denotes an estimate of the caller to do business with the first receiver.

13. The method of claim 11, further comprising:
determining a pricing of the first inbound call lead based at least in part on the lead quality score.

14. The method of claim 11, wherein:
determining the numerical lead quality score further comprises detecting at least one keyword of the detected spoken words during the inbound call.

15. The method of claim 14, further comprising:
determining a pricing of a lead generated by the inbound call based at least in part on determined lead needs from the spoken words of the inbound call.

16. The method of claim 11, wherein:
the one or more characteristics of the inbound call comprise an incoming telephone number and a telephone number called.

17. The method of claim 11, wherein the determining the first receiver of the inbound call comprises:
weighting the characteristics of the inbound call and the characteristics of the caller differently based at least in part on the first category; and
matching characteristics of the first receiver to the weighted characteristics.

18. The method of claim 11, further comprising:
determining a receiver quality score of the first receiver based at least in part on an outcome of the inbound call.

19. The method of claim 18, wherein the determining the first receiver of the inbound call further comprises:
using the receiver quality score in determining which receiver receives the inbound call.

20. The method of claim 11, wherein prior to determining the lead quality score, the method further comprises:
routing, via the inbound call, the caller to the first receiver in response to determining the first receiver of the inbound call.

21. A non-transitory, machine-readable medium comprising a datastore, in communication with a telephony switch, storing information relating to a set of categories and a set of receivers, the machine-readable medium comprising instructions thereon for managing inbound calls, which instructions, when executed by one or more computers or other processing devices, comprising a network interface, in communication with the telephony switch, that facilitates communication with callers and the set of receivers, cause the one or more computers or other processing devices to:

receive, via the telephony switch, an inbound call from a caller;

process a first set of information about the inbound call, the first set of information identifying one or more characteristics of the inbound call based in part on analyzing one or more detected spoken words of the caller captured during the inbound call;

determine a second set of information about the inbound call based at least in part on the first set of information, the second set of information identifying one or more characteristics of the caller;

match a first category to the inbound call based at least in part on the first set of information identifying the characteristics based in part on the analyzing of the detected spoken words of the caller captured during the inbound call, and the second set of information;

determine a first receiver of the inbound call based at least in part on the first category, the first receiver selected from a first set of receivers associated with the first category; and determine a numerical lead quality score of the inbound call based at least in part on call characteristics in which a subset of the call characteristics are detected during the inbound call.

22. The non-transitory, machine-readable medium of claim 21, wherein the determining the first receiver of the inbound call further comprises:
weight the one or more characteristics of the caller based at least in part on the first category to generate one or more weighted characteristics; and
match the one or more weighted characteristics of the caller to characteristics of the first set of receivers associated with the first category.

23. The non-transitory, machine-readable medium of claim 21, wherein the instructions, when executed by the one or more computers or other processing devices, further cause the one or more computers or other processing devices to:
determine the numerical lead quality score of the inbound call based at least in part on an outcome of the inbound call.

24. The non-transitory, machine-readable medium of claim 21, wherein the instructions, when executed by the one or more computers or other processing devices, further cause the one or more computers or other processing devices to:
dynamically price a lead generated from the inbound call based at least in part on an outcome of the inbound call.

25. The non-transitory, machine-readable medium of claim 21, wherein prior to retain the first association information, the instructions, when executed by the one or more computers or other processing devices, further cause the one or more computers or other processing devices to:
route, via the inbound call, the caller to the first receiver in response to determining the first receiver of the inbound call.

26. The non-transitory, machine-readable medium of claim 21, wherein:
the numerical lead quality score denotes an estimate of the caller to do business with the first receiver.

27. The non-transitory, machine-readable medium of claim 21, wherein:

determine the numerical lead quality score further comprises detecting at least one keyword of the detected spoken words during the first inbound call.

* * * * *